United States Patent
Yamashita et al.

(10) Patent No.: US 12,533,893 B2
(45) Date of Patent: Jan. 27, 2026

(54) TRANSPORT DEVICE AND PRINTING APPARATUS

(71) Applicant: SEIKO EPSON CORPORATION, Tokyo (JP)

(72) Inventors: Junpei Yamashita, Azumino (JP); Nobuaki Kamiyama, Matsumoto (JP); Azusa Nei, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 310 days.

(21) Appl. No.: 18/183,196

(22) Filed: Mar. 14, 2023

(65) Prior Publication Data

US 2023/0294936 A1    Sep. 21, 2023

(30) Foreign Application Priority Data

Mar. 16, 2022    (JP) .................................. 2022-041204

(51) Int. Cl.
*B65H 5/02*    (2006.01)
*B08B 1/16*    (2024.01)
(Continued)

(52) U.S. Cl.
CPC .............. *B41J 11/007* (2013.01); *B08B 1/165* (2024.01); *B08B 1/34* (2024.01); *B65H 5/021* (2013.01); *B65H 2301/43827* (2013.01); *B65H 2301/5112* (2013.01); *B65H 2404/232* (2013.01); *B65H 2551/21* (2013.01); *B65H 2553/80* (2013.01)

(58) Field of Classification Search
CPC .............. B65H 5/021; B65H 2301/531; B65H 2301/5115; B41J 11/007; B41J 29/17; B65G 45/12; B65G 45/14; B65G 45/16; B65G 45/18; B08B 1/165
See application file for complete search history.

(56) References Cited

U.S. PATENT DOCUMENTS

2002/0100661 A1*    8/2002    Swinderman .......... B65G 45/16
                                                                198/497
2008/0053791 A1*    3/2008    Swinderman .......... B65G 45/16
                                                                700/213
(Continued)

FOREIGN PATENT DOCUMENTS

JP    2012-116619 A    6/2012
JP    2020132342 A  *  8/2020

*Primary Examiner* — Luis A Gonzalez
(74) *Attorney, Agent, or Firm* — WORKMAN NYDEGGER

(57) ABSTRACT

A transporting belt constituting a transport device transports a medium supported by a front surface in a transport direction. A removal unit includes a blade that comes into contact with the front surface to remove an adhering substance. A plurality of detectors detect a force received by the blade from the transporting belt or a change in the force. A display unit displays information. An adjustment unit is configured to adjust a position of the blade relative to the transporting belt. Each of the detectors are provided corresponding to a respective one of a plurality of regions into which the transporting belt is divided in the width direction intersecting the transport direction. When the control unit determines that there is an abnormal region among the regions based on detection results of the detectors, the control unit causes the display unit to display information indicating the abnormal region.

15 Claims, 17 Drawing Sheets

(51) Int. Cl.
  *B08B 1/34* (2024.01)
  *B41J 11/00* (2006.01)
  *B41J 29/17* (2006.01)

(56) References Cited

U.S. PATENT DOCUMENTS

| | | | |
|---|---|---|---|
| 2014/0253622 A1* | 9/2014 | Momose | B65H 5/021 347/101 |
| 2016/0001329 A1* | 1/2016 | Schwarze | B65G 45/16 29/428 |
| 2016/0355037 A1* | 12/2016 | Yamaguchi | B41J 13/12 |
| 2021/0283908 A1* | 9/2021 | Tsubamoto | B41J 11/04 |

* cited by examiner

TRANSPORT DEVICE AND PRINTING APPARATUS

The present application is based on, and claims priority from JP Application Serial Number 2022-041204, filed Mar. 16, 2022, the disclosure of which is hereby incorporated by reference herein in its entirety.

BACKGROUND

1. Technical Field

The present disclosure relates to a transport device including a transporting belt that transports a medium and a printing apparatus.

2. Related Art

JP-A-2012-116619 discloses, as an example of this type of printing apparatus, a recording device that ejects a liquid such as ink onto a medium such as a recording medium to perform printing. The recording device includes a transport device including a transporting belt (endless belt) that transports a recording medium.

The transport device described in JP-A-2012-116619 includes the endless belt that transports the recording medium placed on a front surface of the endless belt, and a cleaning liquid adhering unit that causes a cleaning liquid to adhere to the front surface of the endless belt and performs cleaning. The transport device includes a plurality of blades that is in contact with the front surface of the endless belt downstream of a cleaning liquid adhering position by the cleaning liquid adhering unit in a moving direction of the endless belt, and removes the cleaning liquid adhering to the front surface of the endless belt.

A secondary blade among the plurality of blades is disposed between a pressing plate and a push-in adjustment plate and is provided so as to be in contact with the front surface of the endless belt across a width direction of the endless belt. A user or an operator changes a fixing position of the secondary blade by changing a fixing position of the push-in adjustment plate. As a result, a push-in amount of the secondary blade with respect to the endless belt is changed. The push-in amount is changed, and thus a contact pressure of the secondary blade with respect to the endless belt can be changed.

However, in the transport device described in JP-A-2012-116619, there is a problem that it is difficult to understand in which region in the width direction of the endless belt the push-in amount of the blade is to be adjusted depending on a proficiency level of the user or the operator. Even when a degree of the proficiency level of the user or the operator is high, in an actual operation, the endless belt needs to be circularly moved a plurality of times in order to search for a region where the cleaning liquid remains in the width direction of the endless belt, which takes extra time.

SUMMARY

A transport device for solving the above-described problem includes a transporting belt including a front surface configured to support a medium, the transporting belt being configured to transport the medium supported by the front surface in a transport direction, a removal unit including a blade configured to come into contact with the front surface to remove an adhering substance adhering to the front surface, a plurality of detectors configured to detect a force received by the blade from the transporting belt or a change in the force, a display unit configured to display information, at least one adjustment unit configured to adjust a position of the blade relative to the transporting belt, and a control unit configured to control driving of the transporting belt and the display unit, wherein each of the detectors is provided corresponding to a respective one of a plurality of regions into which the transporting belt is divided in a width direction intersecting the transport direction, and when the control unit determines that there is an abnormal region among the regions based on detection results of the detectors, the control unit causes the display unit to display information indicating the abnormal region.

A printing apparatus for solving the above-described problem includes a transporting belt including a front surface configured to support a medium, the transporting belt being configured to transport the medium supported by the front surface in a transport direction, a printing unit configured to perform printing on the medium transported by the transporting belt, a removal unit including a blade configured to come into contact with the front surface to remove an adhering substance adhering to the front surface, a plurality of detectors configured to detect a force received by the blade from the transporting belt or a change in the force, a display unit configured to display information, at least one adjustment unit configured to adjust a position of the blade relative to the transporting belt, and a control unit configured to control driving of the transporting belt and the display unit, wherein each of the detectors is provided corresponding to a respective one of a plurality of regions into which the transporting belt is divided in a width direction intersecting the transport direction, and when the control unit determines that there is an abnormal region among the regions based on detection results of the detectors, the control unit causes the display unit to display information indicating the abnormal region.

DESCRIPTION OF EXEMPLARY EMBODIMENTS

First Embodiment

Figure 1:
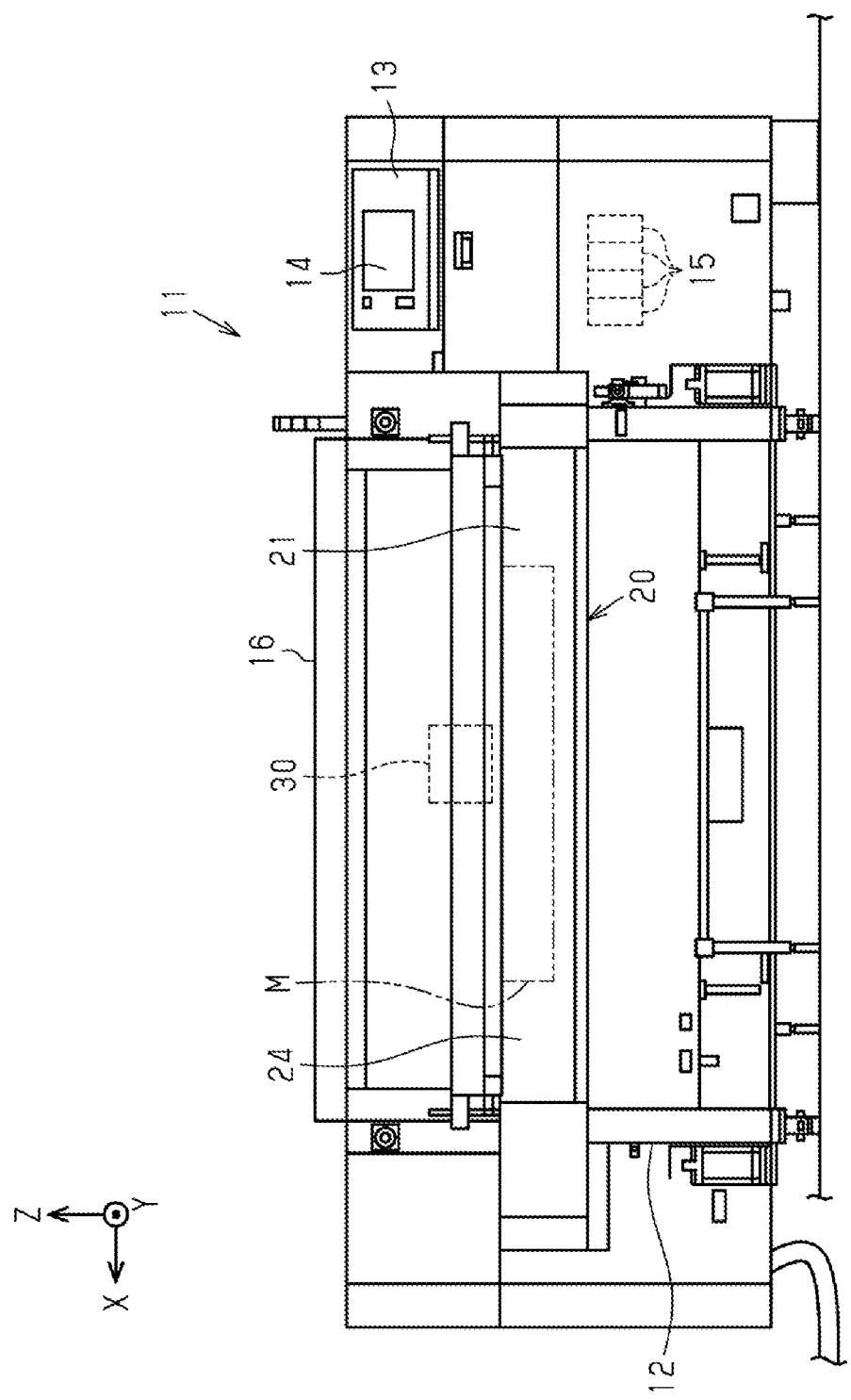
FIG. 1 is a front view illustrating a printing apparatus including a transport device according to an embodiment.

A first exemplary embodiment of a printing apparatus 11 will be described below with reference to the accompanying drawings. In the drawings, a Z-axis represents the direction of gravity and X and Y axes represent directions along a horizontal plane, assuming that the printing apparatus 11 is placed on the horizontal plane. The X, Y, and Z axes are orthogonal to each other. In the following description, a direction along the X-axis is referred to as a width direction X, a direction along the Y-axis is referred to as a transport direction Y, and a direction along the Z-axis is referred to as a vertical direction Z. The X-axis is an imaginary axis parallel to the width direction X of a transporting belt to be described later, and the Y-axis is an imaginary axis parallel to the transport direction Y of a medium M on the transporting belt 21. Note that a direction in which the transporting belt 21 circulates is also referred to as a circulating direction CD.

Configuration of Printing Apparatus 11

As illustrated in FIG. 1, the printing apparatus 11 includes a transport device 20 and a printing unit 30. The transport device 20 includes a transporting belt 21 that transports the medium M. The transporting belt 21 supports and transports the medium M such as fabric and paper on an outer peripheral surface 24. The printing unit 30 performs printing on the medium M transported by the transporting belt 21.

The printing apparatus 11 includes a housing 12 having a column-beam structure. The printing apparatus 11 includes an operation unit 13. The printing apparatus 11 also includes a display unit 14 for reporting information. The operation unit 13 includes, for example, an operation panel including a display unit 14. The display unit 14 is realized by, for example, a display device of a touch panel system. The operation unit 13 can give an instruction to the printing apparatus 11 when a screen of the display unit 14 is operated by a user. Note that the operation unit 13 may be realized by an operation button or the like. In this case, the printing apparatus 11 may include the display unit 14 separately from the operation unit 13.

The printing apparatus 11 also includes ink supply sources 15 that supplies inks used when the printing unit 30 performs printing on the medium M. Each of the ink supply sources 15 stores one color ink among the inks of a plurality of colors. The ink colors include, for example, cyan, magenta, yellow, and black. The printing unit 30 prints an image or the like on the medium M by ejecting the inks supplied from the ink supply sources 15 toward, for example, the medium M. Note that the ink supply source 15 may be an ink cartridge or an ink tank.

Figure 2:
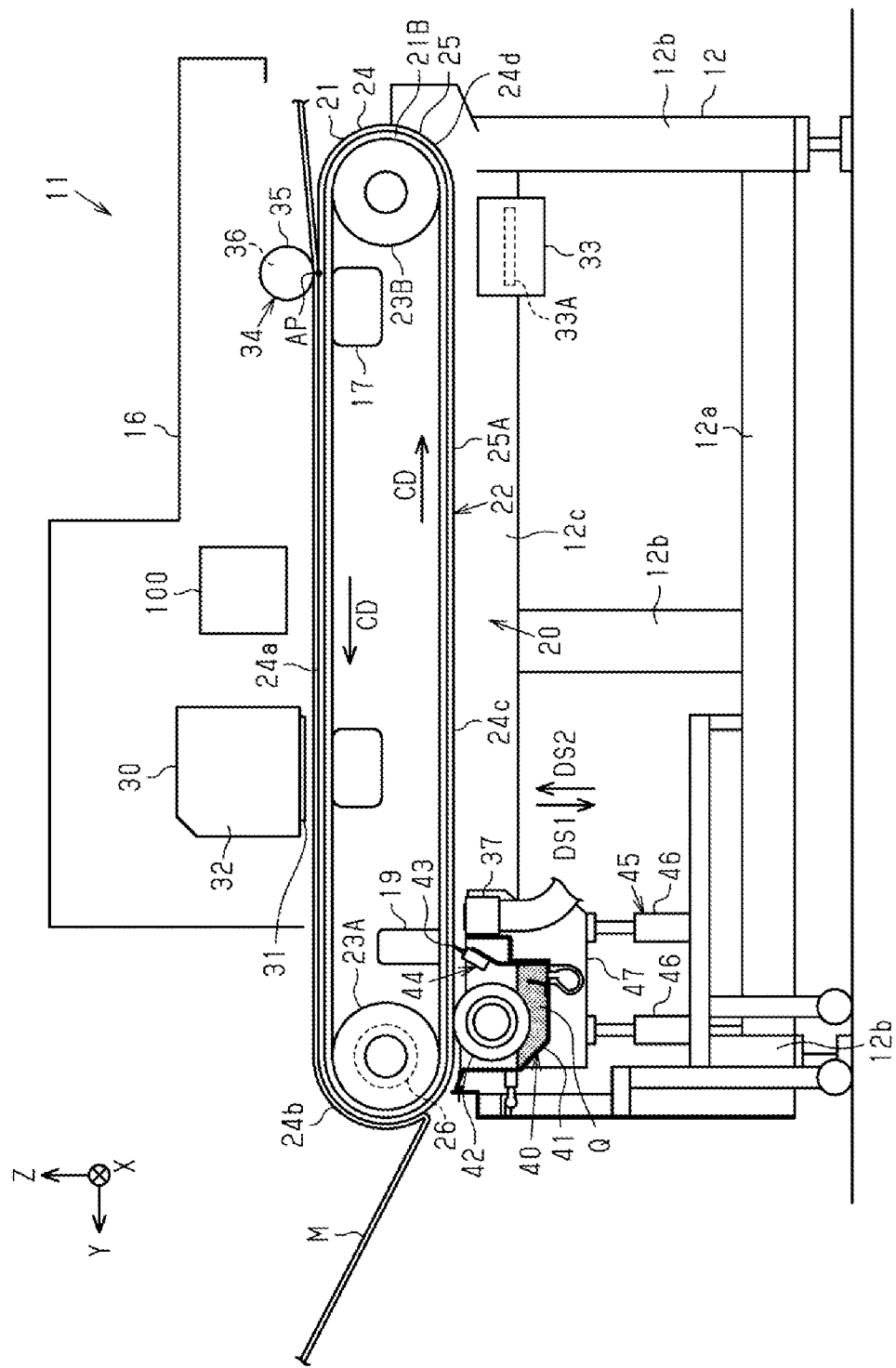
FIG. 2 is a schematic side cross-sectional view illustrating the printing apparatus.

As illustrated in FIG. 2, the printing apparatus 11 includes the transport device 20. The transport device 20 is supported by the housing 12. The transport device 20 includes the above-described printing unit 30 and a control unit 100 that controls the transport device 20 and the printing unit 30. The printing unit 30 performs printing on the medium M transported by the transporting belt 21. The printing unit 30, the control unit 100, and the like are covered by a cover 16.

The housing 12 has the column-beam structure including a bottom frame 12a, a column frame 12b, and an upper frame 12c. The cover 16 is an outer packaging member that covers, for example, the printing unit 30 or the like located above the transporting belt 21 in the printing apparatus 11.

The printing unit 30 includes an ejecting unit 31 that ejects a liquid such as ink. The printing unit 30 performs a printing operation of printing an image or the like on the medium M by ejecting the liquid such as ink from the ejecting unit 31 toward the medium M supported by the transporting belt 21.

The transport device 20 includes a transporting unit 22 including the transporting belt 21 so as to be rotatable. The transporting belt 21 includes a front surface 25A that supports the medium M, and is configured to transport the medium M supported by the front surface 25A in the transport direction Y. The transporting belt 21 may include an adhesive layer 25 to which the medium M can be attached. The transporting belt 21 may be configured to transport the medium M attached to the adhesive layer 25 in the transport direction Y. When the transporting belt 21 includes the adhesive layer 25, an outermost layer of the adhesive layer 25 functions as the front surface 25A.

The transporting belt 21 includes a belt base material 21B being endless and one layer of the adhesive layer 25 formed at an outer peripheral surface of the belt base material 21B. The medium M is attached to the front surface 25A of the adhesive layer 25. The adhesive layer 25 has an adhesive property of capable of temporarily adhering to other members and capable of being peeled-off from an adhesion state.

As illustrated in FIG. 2, the transporting unit 22 is provided in an upper portion of the housing 12 and includes a driving roller 23A, a driven roller 23B, and the transporting belt 21. The transporting unit 22 is capable of transporting the medium M in a +Y direction in accordance with movement of the transporting belt 21 by a rotation of the driving roller 23A. Both the driving roller 23A and the driven roller 23 include a rotary shaft along the X-direction. The printing apparatus 11 includes a feeding unit 18 (see FIG. 9) that feeds the medium M to be attached to the transporting belt 21. Note that the printing apparatus 11 is used as a set with a winding device (not illustrated) that winds the medium M after printing while peeling off the medium M from the transporting belt 21.

The transporting belt 21 is an endless belt having elasticity. The transporting belt 21 is wound around the outer peripheries of the driving roller 23A and the driven roller 23B. The transporting unit 22 rotates the transporting belt 21 being endless in a predetermined circulating path by rotationally driving the driving roller 23A.

As illustrated in FIG. 2, the outer peripheral surface 24 of the transporting belt 21 is divided into a plurality of portions according to positions and shapes of the outer peripheral surface 24. That is, the outer peripheral surface 24 is divided into an upper surface portion 24a, a curved surface portion 24b being downstream, a lower surface portion 24c, and a curved surface portion 24d being upstream. The upper surface portion 24a is a portion located above the center of the driving roller 23A and including a flat surface along the XY plane. The upper surface portion 24a is a portion of the transporting belt 21 and facing the printing unit 30 in the circulating direction CD. The upper surface portion 24a is a portion where the transporting belt 21 supports the medium M. The curved surface portion 24b is a portion including a curved surface where the transporting belt 21 is wound around the driving roller 23A. The medium M attached to the adhesive layer 25 is peeled off in the middle of the curved surface portion 24b. The lower surface portion 24c is a portion located below the center of the driving roller 23A and including a flat surface along the XY plane. The curved surface portion 24d is a portion including a curved surface where the transporting belt 21 is wound around the driven roller 23B. Thus, at least a front surface of the upper surface portion 24a and a front surface of the curved surface portion 24b function as support surfaces of the transporting belt 21 that supports the medium M. Note that in addition to the front surface of the upper surface portion 24a and the front surface of the curved surface portion 24b, a front surface of the curved surface portion 24d may function as a support surface of the transporting belt 21 that supports the medium M.

The transport device 20 includes a transport motor 26 that is a drive source of the driving roller 23A. The transport motor 26 is driven by the control unit 100, and thus driving and stopping, and a transport speed of the transporting belt 21 during driving are controlled.

Here, for the adhesive layer 25, a heat-sensitive type and a pressure-sensitive type are available. The adhesive layer 25 of the heat-sensitive type has a property in which an adhesive force increases as the temperature increases. The adhesive layer 25 of the pressure-sensitive type has a property in which the adhesive force increases as the pressure increases. The adhesive layer 25 of the present example is the heat-sensitive type. Thus, the transport device 20 includes a first heating unit 33 and a second heating unit 36 that heat the adhesive layer 25. Here, the adhesive layer 25 of the pressure-sensitive type also has a property in which the adhesive force increases as the temperature increases. However, when a degree of a change ΔF in the adhesive force with respect to a change ΔT in the temperature is defined as ΔF/ΔT, ΔF/ΔT of the adhesive layer 25 of the heat-sensitive type is larger than ΔF/ΔT of the adhesive layer 25 of the pressure-sensitive type. Note that in the case of the adhesive layer 25 of the pressure-sensitive type, the first heating unit 33 need not be provided.

The first heating unit 33 heats the transporting belt 21 at a portion where the medium M is not attached. The first heating unit 33 heats the adhesive layer 25 at a position upstream of an attachment start position AP at which attachment of the medium M to the adhesive layer 25 is started in the transport direction Y. The first heating unit 33 includes a heater 33A serving as a heat source. Specifically, the first heating unit 33 heats the adhesive layer 25 of the transporting belt 21 at a predetermined position in a section up to the attachment start position AP at which the medium M is attached to the transporting belt 21 after cleaned by a cleaning unit 40.

The transport device 20 includes a pressing unit 34 that presses the medium M to attach the medium M to the transporting belt 21. The pressing unit 34 includes a pressing roller 35 that rotates while pressing the medium M. The second heating unit 36 heats the pressing roller 35. The heated pressing roller 35 heats the medium M when pressing the medium M. The pressing roller 35 presses the medium M, thus attaching the medium M to the front surface 25A of the transporting belt 21. For this reason, the heated pressing roller 35 heats the front surface 25A of the transporting belt 21 when pressing the medium M.

The pressing unit 34 is a mechanism that presses the medium M against the adhesive layer 25 in order to attach the medium M to the adhesive layer 25. The pressing roller 35 reciprocates in the +Y direction and the −Y direction within a predetermined range in the Y-axis direction while pressing the medium M fed onto the transporting belt 21, and thus the pressing unit 34 attaches the medium M to the front surface 25A of the adhesive layer 25. The pressing roller 35 is heated by the second heating unit 36 and presses the medium M against the adhesive layer 25 while heating the adhesive layer 25 from above the medium M. When the transporting belt 21 is pressed by the pressing roller 35, the transporting belt 21 is supported by a support 17 located on a side opposite to the pressing roller 3 with transporting belt 21 interposed therebetween.

As illustrated in FIG. 2, the printing unit 30 is provided above the transport device 20. The printing unit 30 is configured to perform printing on the medium M transported in the transport direction Y. The printing unit 30 may be a serial printing system or a line printing system. In the case of the serial printing system, the printing unit 30 includes the ejecting unit 31 and a carriage 32 that supports the ejecting unit 31 so as to be capable of reciprocating along the width direction X. The ejecting unit 31 is disposed at a position in the +Z direction with respect to the medium M, and performs printing on the medium M by ejecting the ink as an example of the liquid onto a surface to be printed of the medium M. The ejecting unit 31 is controlled by the control unit 100. The medium M after printing is peeled off from the curved surface portion 24b of the transporting belt 21 by a force with which a winding device (not illustrated) winds the medium M in a roll shape.

As illustrated in FIG. 2, the transport device 20 includes the cleaning unit 40 that cleans the transporting belt 21, a removal unit 44 that removes deposits including a cleaning liquid and the like from the transporting belt 21, and a drying unit 37 that dries the transporting belt 21 after cleaning.

The cleaning unit 40 cleans the transporting belt 21 at a portion of the lower surface portion 24c. The cleaning unit 40 is disposed at a position in the −Z direction with respect to an end portion of the lower surface portion 24c in the +Y direction. The cleaning unit 40 cleans the adhesive layer 25 by causing the cleaning liquid as the example of the liquid to adhere to the front surface 25A of the adhesive layer 25. The cleaning unit 40 is controlled by the control unit 100. Note that the cleaning unit 40 will be described in detail later.

The removal unit 44 includes a blade 43 that comes into contact with the front surface 25A of the transporting belt 21 to remove the adhering substance adhering to the front surface 25A. The removal unit 44 is disposed at a position downstream of the cleaning unit 40 in the circulating direction CD.

The drying unit 37 dries the transporting belt 21 after cleaning. The drying unit 37 is disposed at a position downstream of the cleaning unit 40 in the circulating direction CD. In the example illustrated in FIG. 2, the drying unit 37 is disposed at a position adjacent to the cleaning unit 40 in the −Y direction. For example, the drying unit 37 blows air toward the outer peripheral surface 24. For example, the drying unit 37 dries the outer peripheral surface 24 (front surface 25A) by blowing warm air.

The transport device 20 includes an elevating mechanism 45 that elevates the cleaning unit 40. The cleaning unit 40 is configured to be elevatable in the Z-axis direction with respect to the transporting belt 21 by the elevating mechanism 45. The elevating mechanism 45 includes, for example, one or a plurality of (in the example in FIG. 2, a plurality of) electric actuators 46 as the drive source. A rod of the electric actuator 46 is fixed to a frame 47 of the cleaning unit 40. The elevating mechanism 45 disposes the cleaning unit 40 at a retracted position where a brush 42 and the blade 43 are separated downward of the front surface 25A when the cleaning unit 40 is not used, and disposes the cleaning unit 40 at a cleaning position where the brush 42 and the blade 43 are in contact with the front surface 25A when the cleaning unit 40 is used.

A direction in which the blade 43 moves away from the adhesive layer 25 is referred to as a first direction DS1, and a direction opposite to the first direction DS1 and in which the blade 43 approaches the adhesive layer 25 is referred to as a second direction DS2. The elevating mechanism 45 is configured to move the blade 43 in the first direction DS1 and the second direction DS2 with respect to the front surface 25A. The cleaning unit 40 is disposed at the retracted position where the brush 42 and the blade 43 are separated downward of the front surface 25A when the cleaning unit 40 is not used, and disposed at the cleaning position where the brush 42 and the blade 43 are in contact with the front surface 25A when the cleaning unit 40 is used. Note that in the example illustrated in FIG. 2, the drying unit 37 is also configured to be elevatable together with the cleaning unit 40 by the elevating mechanism 45.

The control unit 100 includes a central processing unit (CPU) and a memory (which are not illustrated). The CPU is an arithmetic processing device. The memory serves as a storage device in which a region for storing a program of the CPU, a work region, and the like are secured, and includes a storage element or a storage such as a Random Access Memory (RAM) and an Electrically Erasable Programmable Read Only Memory (EEPROM). The CPU controls an operation of each unit of the printing apparatus 1 in accordance with the program stored in the memory. That is, the control unit 100 controls the transporting unit 22, the first heating unit 33, the pressing unit 34, the printing unit 30, the cleaning unit 40, the drying unit 37, and the like.

Figure 3:
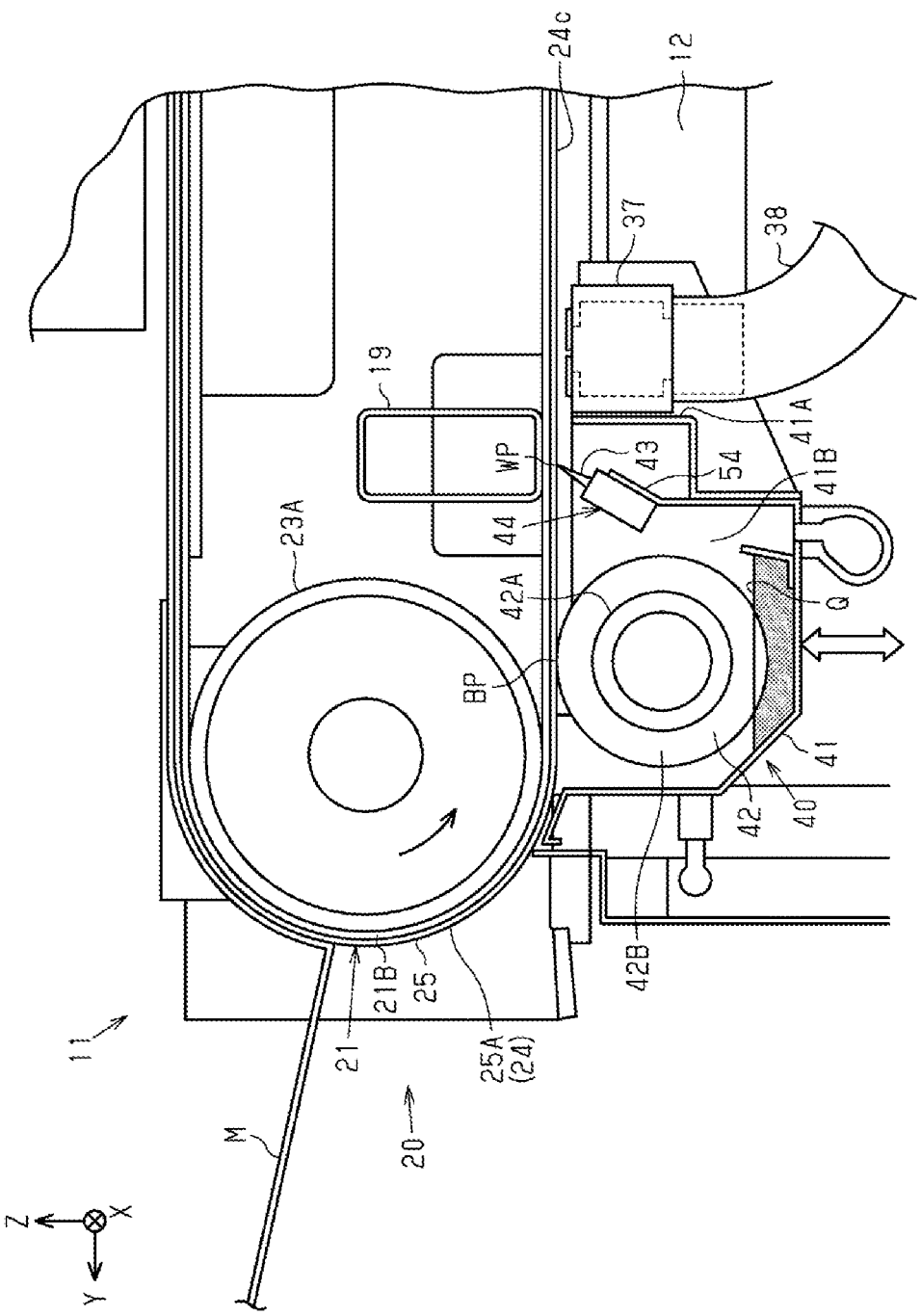
FIG. 3 is a schematic side cross-sectional view illustrating a cleaning unit and the like in the transport device.

Next, a detailed configuration of the cleaning unit 40 will be described with reference to FIG. 3. As illustrated in FIG. 3, the cleaning unit 40 includes a storage tank 41 that stores a cleaning liquid Q, the brush 42, and the removal unit 44 including the blade 43. The brush 42 performs a cleaning operation of coming into contact with the front surface 25A and brushing the front surface 25A using the cleaning liquid Q. The removal unit 44 includes the blade 43 that comes into contact with the front surface 25A of the adhesive layer 25 and removes the adhering substance adhering to the front surface 25A. The blade 43 comes into contact with the front surface 25A of the adhesive layer 25 and removes the adhering substance such as the cleaning liquid adhering to the front surface 25A.

As the ejecting unit 31 performs printing on the medium M, the liquid may adhere to the outer peripheral surface 24 of the transporting belt 21. For example, when the medium M is fabric, the liquid such as ink that has seeped through may adhere to the outer peripheral surface 24. When the medium M is peeled off from the outer peripheral surface 24, lint of the fabric may remain on the outer peripheral surface 24. The liquid such as ink adhering to the outer peripheral surface 24 may cause the medium M to be stained, and the lint remaining on the outer peripheral surface 24 may cause the adhesive force of the medium M to the outer peripheral surface 24 to be reduced. In the cleaning unit 40, the outer peripheral surface 24 of the transporting belt 21 is cleaned by the brush 42 in order to remove the liquid and the dust caused by the medium base material adhering to the outer peripheral surface 24.

The storage tank 41 is disposed below the driving roller 23A and the transporting belt 21. The storage tank 41 has a box shape with an open top. The cleaning liquid Q for cleaning the outer peripheral surface 24 is stored in the storage tank 41. The cleaning liquid Q stored in the storage tank 41 is supplied to the brush 42 that performs the cleaning operation.

The brush 42 includes a shaft body 42A having a cylindrical shape and a brush unit 42B radially extending from the outer peripheral surface of the shaft body 42A. The shaft body 42A extends along the width direction X, and includes a pair of shaft portions 42C (only one is illustrated in FIG. 3) protruding outward at both end portions in the width direction X. The shaft portions 42C are rotatably supported at a part of a sidewall 41B of the storage tank 41. The lower part of the brush unit 42B is immersed in the cleaning liquid Q.

The brush unit 42B is configured to be in contact with the lower surface portion 24c of the transporting belt 21. The brush 42 is rotated by a motor (not illustrated), and thus the brush 42 performs the cleaning operation of removing the liquid such as ink and dust such as lint generated from the medium M adhering to the front surface 25A of the transporting belt 21 using the cleaning liquid Q stored in the storage tank 41. The liquid and the lint removed from the transporting belt 21 by the brush 42 are collected by the cleaning liquid Q in the storage tank 41. As described above, the cleaning liquid Q in the storage tank 41 has a function of supplying the cleaning liquid Q necessary for the cleaning operation to the brush 42 and a function of washing off the liquid such as ink and the dust such as the lint adhering to the brush 42 by the cleaning operation.

As illustrated in FIG. 3, the removal unit 44 including the blade 43 is mounted to a part of the storage tank 41 at a position downstream of the brush 42 in the circulating direction CD. The blade 43 wipes off the cleaning liquid Q and the like remaining on the front surface 25A after cleaning by the brush 42 from the front surface 25A. The blade 43 is supported by a bracket 54 in a posture inclined backward in the −Y direction at a predetermined angle with respect to the Z-axis direction, and can suitably wipe off the cleaning liquid Q and the like remaining on the front surface 25A.

Note that as illustrated in FIG. 3, an inner frame 19 is provided on the inner side (+Z direction side) of a portion with which a tip portion of the blade 43 comes into contact in the transporting belt 21. The inner frame 19 is erected in the housing 12 in a state of extending in the X-axis direction and supports the transporting belt 21 from the inside. Thus, the transporting belt 21 can resist an applied force from the blade 43.

As illustrated in FIG. 3, the storage tank 41 includes a rear wall 41A extending upward in a state in which a base end portion is fixed to an outer wall surface in the −Y direction. The drying unit 37 of a spray-type is supported by the rear wall 41A. That is, the drying unit 37 is supported by the cleaning unit 40. For example, the drying unit 37 sprays heated air supplied through a hose 38 to the front surface 25A of the adhesive layer 25. Note that a position where the brush 42 cleans the front surface 25A of the transporting belt 21 is a brushing position BP. A position where the blade 43 comes in contact with the front surface 25A is a wiping position WP.

Figure 4:
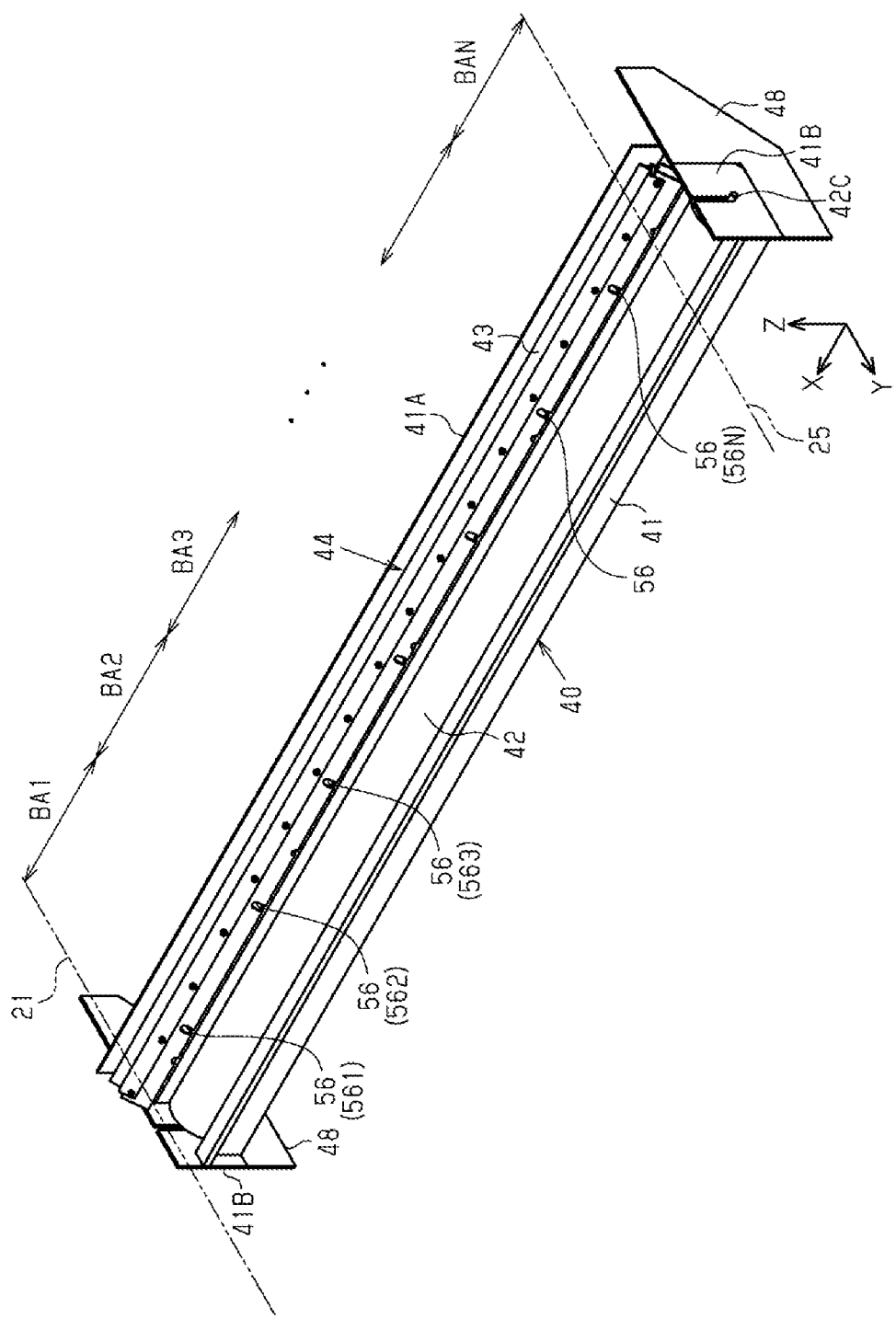
FIG. 4 is a perspective view illustrating the cleaning unit and a transporting belt.

As illustrated in FIG. 4, the brush 42 and the blade 43 are provided across the width direction X of the transporting belt 21. A length of the brush 42 in the X direction is slightly longer than a width dimension of a region of the front surface 25A of the transporting belt 21 to which the medium M having the maximum width in the X direction is to be attached. Thus, the entirety of the region of the front surface 25A of the transporting belt 21 to which the medium M is to be attached is cleaned by the brush 42. A length of the blade 43 in the width direction X is slightly longer than the length of the brush 42 in the width direction X. As a result, the blade 43 wipes off a wider range than a range in which the brush 42 performs the cleaning operation in the width direction X with respect to the front surface 25A of the transporting belt 21. The blade 43 can reliably wipe off the cleaning liquid Q and the like remaining after the cleaning by the brush 42, and can suppress the cleaning liquid Q from being left unwiped. A side plate 48 fixed to the sidewall 41B on an outer side in the width direction X extends in the −Y direction beyond the rear 41A when viewed from the X direction. The drying unit 37 illustrated in FIG. 3 is supported by a portion of the side plate 48 extending in the −Y direction.

As illustrated in FIG. 4, the transporting belt 21 is divided into a plurality of regions BA1 to BAN in the width direction X intersecting the transport direction Y. That is, the adhesive layer 25, i.e., the front surface 25A is divided into N regions BA1 to BAN in the width direction X, where N is a natural number of 2 or more.

The removal unit 44 is provided with an adjustment unit 56 that can adjust a position of the blade 43 relative to the transporting belt 21. Each of a plurality of the adjustment units 56 is provided at a respective one of different positions in the width direction X. The adjustment unit 56 is configured to adjust a pressing force with which the blade 43 is pressed against the front surface 25A of the transporting belt 21. Each of the plurality of adjustment units 56 is provided at a position corresponding to a respective one of the plurality of regions BA1 to BAN. That is, each of the plurality of adjustment units 56 is provided corresponding to a respective one of the regions BA1 to BAN obtained by dividing the transporting belt 21 into the plurality of regions BA1 to BAN. N adjustment units 56 are provided to be capable of adjusting the pressing force with which the blade 43 is pressed against the transporting belt 21 for each of the regions BA1 to BAN. The N adjustment units 56 include a first adjustment unit 561 and a second adjustment unit 562 different from the first adjustment unit 561. The N adjustment units 56 include the first adjustment unit 561, the second adjustment unit 562 . . . and an Nth adjustment unit 56N.

Figure 5:
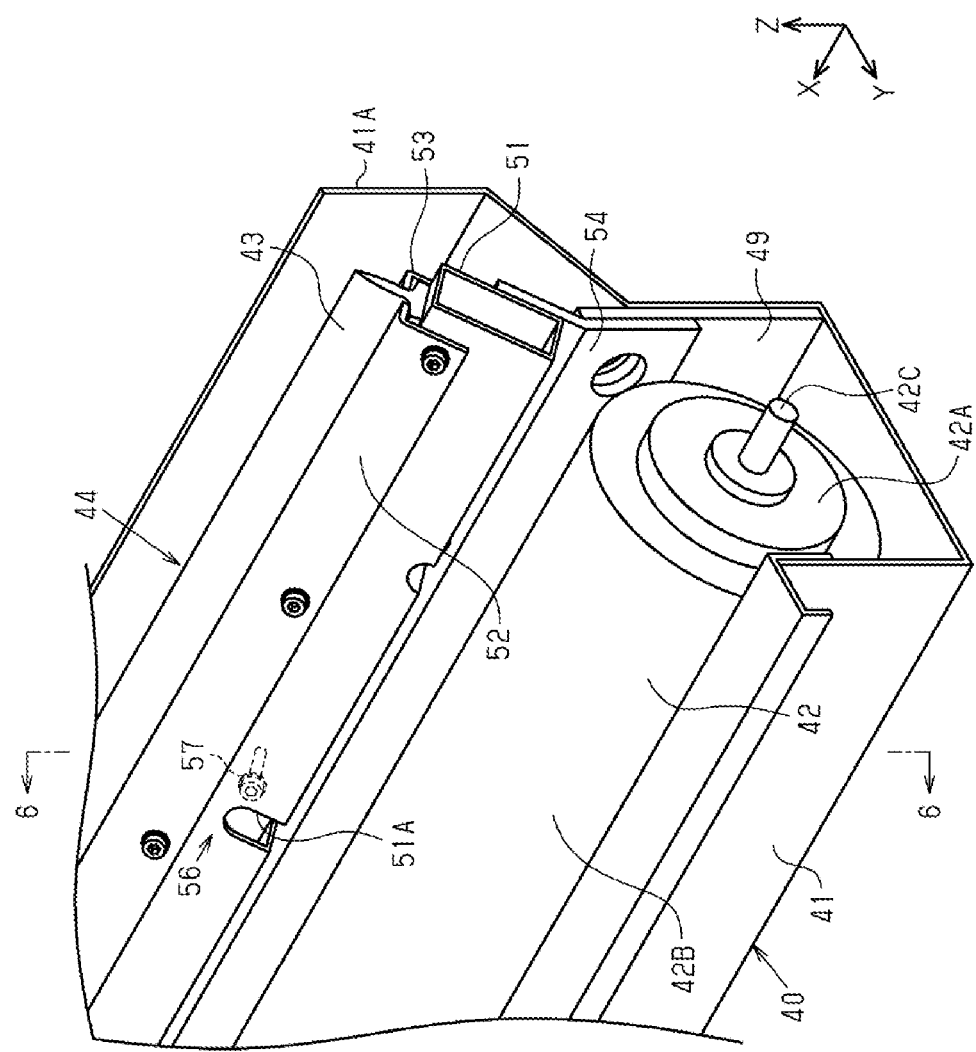
FIG. 5 is a perspective view illustrating a part of the cleaning unit.

As illustrated in FIG. 5, the removal unit 44 includes a blade holder 51 that supports the blade 43, holding members 52 and 53 that hold the blade 43 in a positioned state with respect to the blade holder 51, and a bracket 54 that supports the blade holder 51. The bracket 54 is fixed to a plate member 49 extending in the +Z direction from a part of the rear wall 41A on a base end side. The center of the bracket 54 is inclined backward in the −Y direction at a predetermined angle. Due to the angle of the bracket 54 inclined backward, the blade 43 can suitably scrape off the cleaning liquid Q and the like remaining on the lower surface portion 24c (see FIG. 2) after cleaning by the brush 42.

Next, a configuration for supporting the blade 43 will be described in detail with reference to FIG. 6.

In the drawing, directions along a joint surface between the blade holder 51 and the bracket 54 are indicated by an α-axis and a β-axis, and an axis orthogonal to the α-β plane is indicated by a γ-axis. The α-axis, β-axis, and γ-axis are orthogonal to each other. The α-axis and the X-axis are substantially parallel to each other. In the following description, a direction along the α-axis is also referred to as a width direction α, a direction along the β-axis is also referred to as an extending direction β since the direction is also the extending direction of the blade 43, and a direction along the γ-axis is also referred to as a vertical direction γ since the direction is perpendicular to the above-described joint surface.

Figure 6:
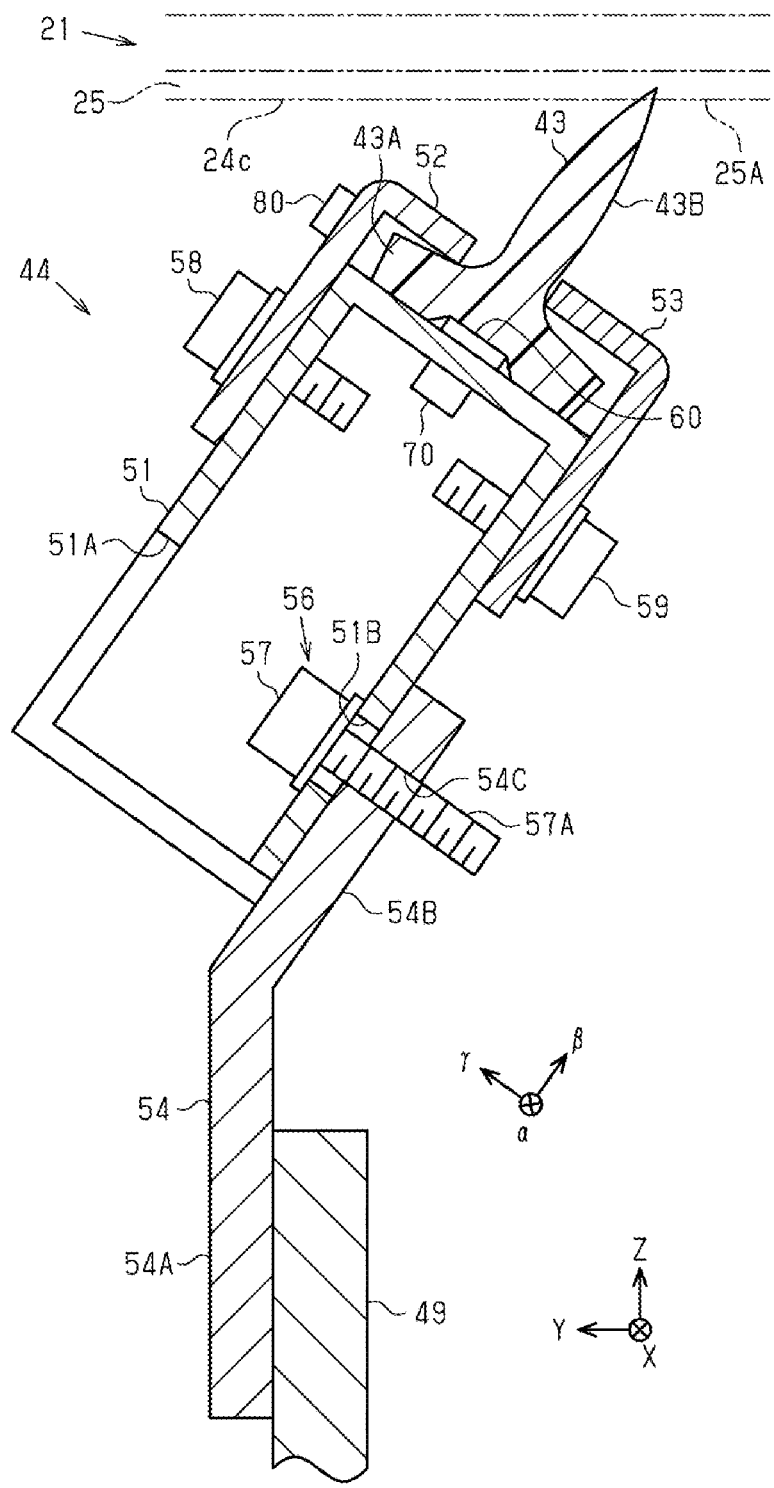
FIG. 6 is a cross-sectional view of a removal unit taken along line 6-6 in FIG. 5.

As illustrated in FIG. 6, a first portion 54A and a second portion 54B are formed in the bracket 54 by bending a plate material. The first portion 54A is provided along the plate member 49 (see FIG. 5). The second portion 54B is inclined backward in the −Y direction with respect to the first portion 54A. The blade holder 51 constituting the removal unit 44 is fixed to the second portion 54B of the bracket 54 by a screw 57. The blade holder 51 is formed of a pipe member having a square tubular shape, and the inside thereof is hollow.

A first holding member 52 and a second holding member 53 that hold the blade 43, are fixed to a tip portion of the blade holder 51 by screws 58 and 59, respectively. In FIG. 6 viewed from the X-axis direction, the blade 43 includes a base portion 43A extending in the vertical direction γ and a blade portion 43B extending in the extending direction β from the center of the base portion 43B. The blade 43 is placed on the blade holder 51 in a state in which a bottom surface of the base portion 43A is in contact with the front surface of the blade holder 51 on the extending direction β side. The tip portion of the first holding member 52 comes into contact with the base portion 43A of the blade 43, thus suppressing the displacement of the blade 43 in the extending direction R. The tip portion of the second holding member 53 comes into contact with the side surface of the blade 43 closer to the base portion 43A, thus suppressing a displacement of the blade 43 in the vertical direction γ (particularly, in the −γ direction). That is, the second holding member 53 suppresses a displacement of the blade 43 due to a force received by the blade 43 from the adhesive layer 25 when the transporting belt 21 rotates in the circulating direction CD. In this way, the blade 43 is held in the posture inclined backward at the predetermined angle in a state in which the displacements in the extending direction β and the −γ direction are suppressed.

As illustrated in FIG. 6, the adjustment unit 56 is configured to adjust the position of the blade 43 in the extending direction β with respect to the transporting belt 21. The adjustment unit 56 includes the screw 57 for fixing the blade holder 51 to the bracket 54, an elongated hole 51B formed in the blade holder 51 so that a shaft portion 57A of the screw 57 is capable of being inserted therein, and a threaded hole 54C formed in the bracket 54 so that the shaft portion 57A of the screw 57 capable of being screwed therein. The elongated hole 51B has a hole shape in which a size in the width direction α is slightly larger than the outer diameter of the shaft portion 57A, and a size in the extending direction β is longer than the size in the width direction α. Thus, a position where the shaft portion 57A is inserted into the elongated hole 51B is adjusted within a range of the extending direction β of the elongated hole 51B, and thus a position where the blade holder 51 is fixed to the bracket 54 is capable of being adjusted in the extending direction β. By adjusting the position of the blade holder 51 in the extending direction β, the position of the blade 43 with respect to the transporting belt 21 is capable of being adjusted in the extending direction β. A hole 51A for an operation is formed in the blade holder 51 at a position corresponding to the adjustment unit 56. The hole 51A for the operation opens a predetermined region including a position corresponding to the adjustment unit 56 in the vertical direction γ in the blade holder 51. The user inserts a tool such as a screwdriver, a wrench, or the like through the hole 51A for the operation, thus operating the screw 57 with the tool.

The transport device 20 of the present embodiment includes detectors 60 and 70 illustrated in FIG. 6 that detect a force received by the blade 43 from the transporting belt 21 or a change in the force. In the present example, two types of detectors, that is, the first detector 60 and the second detector 70 are provided. The first detector 60 detects a force received by the blade 43 from the transporting belt 21.

The first detector 60 detects the force received by the blade 43 from the transporting belt 21 as a load. That is, the first detector 60 detects the load (force) received from the transporting belt 21 as a reaction force of the pressing force with which the blade 43 presses the front surface 25A of the transporting belt 21. The first detector 60 is provided at a position where the first detector 60 is capable of detecting the load received by the blade 43 from the transporting belt 21.

In the example illustrated in FIG. 6, the first detector 60 is provided at a position sandwiched between an upper surface of the blade holder 51 and the bottom surface of the base portion 43A of the blade 43. The first detector 60 detects a load acting on the bottom surface of the base portion 43A of the blade 43 due to the reaction force from the transporting belt 21. Since the first detector 60 is in a state of being sandwiched between the blade 43 and the blade holder 51, the first detector 60 can detect the load received by the blade 43 from the transporting belt 21 with high sensitivity. In addition, the cleaning liquid Q and a removed matter such as the dust (fiber waste and the like) removed from the front surface 25A of the transporting belt 21 are prevented from adhering to the first detector 60 by the blade 43.

The first detector 60 is, for example, a pressure sensor. The first detector 60 is not limited to the pressure sensor and may be another sensor capable of detecting the load, such as a strain sensor.

The second detector 70 detects the change in the force received by the blade 43 from the transporting belt 21. The second detector 70 of the present example detects vibration of the blade 43 generated when the transporting belt 21 moves in the transport direction Y as the change in the force received by the blade 43 from the transporting belt 21. Specifically, the second detector 70 detects the vibration of the blade 43 generated in the blade 43 that comes into contact with the adhesive layer 25 when the transporting belt 21 rotates in the circulating direction CD in which the medium M is transported in the transport direction Y. The second detector 70 is mounted to, for example, the blade holder 51. In the example illustrated in FIG. 6, the second detector 70 is mounted to the inside of the blade holder 51 and detects the vibration propagated to the blade holder 51. The second detector 70 is, for example, an acceleration sensor or a gyro sensor (angular velocity sensor). Note that the second detector 70 is not limited to the sensor such as the acceleration sensor and may be another sensor capable of detecting the vibration of the blade 43. The second the second detector 70 may be mounted to the blade 43 or may be mounted to the bracket 54.

As illustrated in FIG. 6, the detectors 60 and 70 are mounted to the removal unit 44 including the blade 43. The second detector 70 is provided in the removal unit 44, and thus the second detector 70 can detect the vibration of the blade 43 at a position where the vibration is not so attenuated. In the example illustrated in FIG. 6, the second detector 70 is mounted to the blade holder 51. The blade holder 51 is a plate member having a cylindrical shape that supports the blade 43. The second detector 70 is mounted to the inside (inside the cylinder) of the blade holder 51. Thus, the second detector 70 can detect the vibration of the blade 43 with high sensitivity. In addition, the second detector 70 is prevented from being soiled by the removed matter such as the dust removed from the front surface 25A of the transporting belt 21 by the blade 43.

As illustrated in FIG. 6, the removal unit 44 is provided with a light-emitting unit 80. The light-emitting unit 80 is mounted to the removal unit 44 at a position visible from the user who operates the adjustment unit 56. In the example illustrated in FIG. 6, the light-emitting unit 80 is mounted to a surface of the first holding member 52 constituting the removal unit 44, the surface facing the +γ direction. Note that the light-emitting unit 80 may be mounted at a position avoiding the hole 51A on the outer surface of the blade holder 51 facing the +γ direction.

Configurations of Removal Unit 44 and Detectors 60 and 70

Next, an example of a mounting structure of the detector 60 mounted to the removal unit 44 will be described with reference to FIGS. 7 and 8. Some examples of the mounting structure in which the detector 60 is mounted to the removal unit 44 will be described below.

Figure 7:
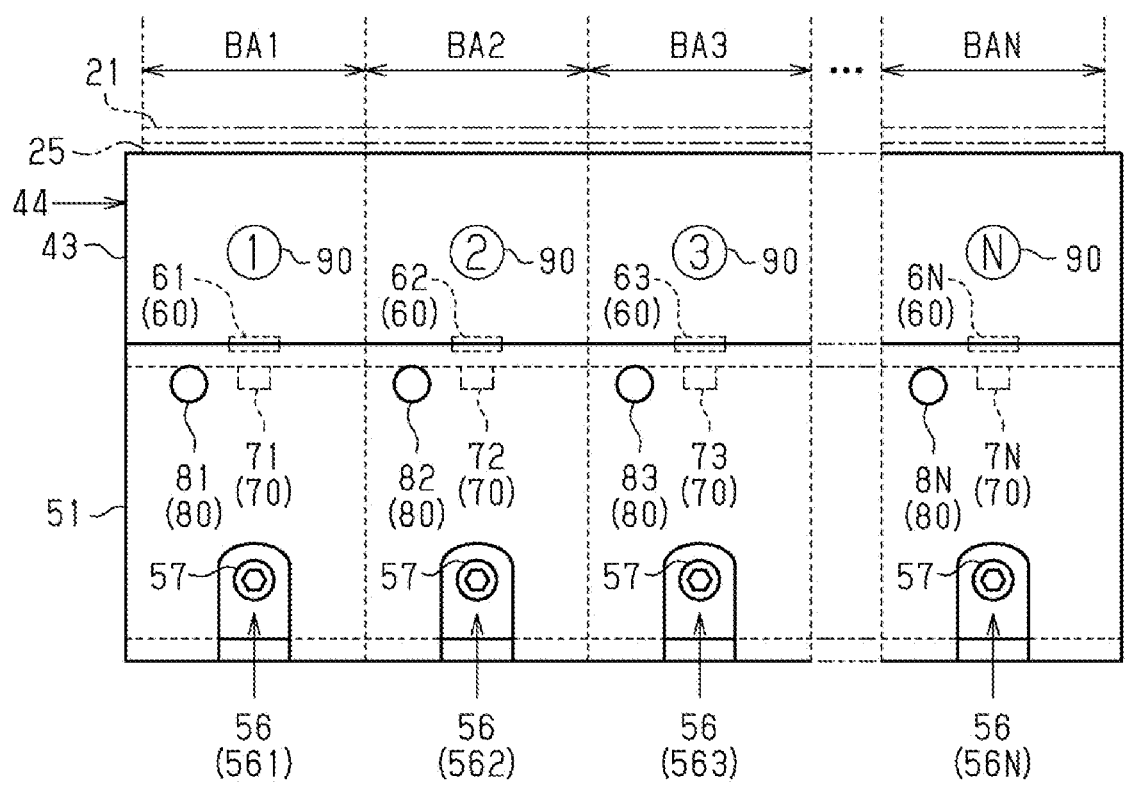
FIG. 7 is a schematic front view illustrating the removal unit according to a second embodiment.

FIG. 7 is a cross-sectional view of the removal unit 44 viewed from the transport direction Y. As illustrated in FIG. 7 with a double-dashed line, the transporting belt 21 is divided into the plurality of regions BA1 to BAN in the width direction X intersecting the transport direction Y. In the example illustrated in FIG. 7, the transporting belt 21 is divided into N regions BA1 to BAN in the width direction X (where N is a natural number of 2 or more). That is, the adhesive layer 25 of the transporting belt 21 is divided into the N regions BA1 to BAN in the width direction X. Each of the detectors 60 and each of the detectors 70 are provided corresponding to a respective one of the regions obtained by dividing the transporting belt 21 into the plurality of regions BA1 to BAN in the width direction X.

In the removal unit 44, each of N second detectors 70 that detect vibration of the blade 43 is provided at a position corresponding to a respective one of the N regions BA1 to BAN. That is, in the removal unit 44, the N detectors 60 that detect the load received by the blade 43 from the transporting belt 21 are provided at positions corresponding to the N regions BA1 to BAN, respectively. A plurality (N) of the first detectors 60 including a first detector 61 and a first detector 62 different from the first detector 61 are provided. When the number of the first detectors 60 is N, the N first detectors 60 include the first detector 61, the first detector 62 . . . and a first detector 6N. Note that all of the N detectors 60 need not be provided at positions corresponding to the N regions BA1 to BAN, respectively. For example, among the N regions BA1 to BAN, there may be a region where the first detector 60 is not provided.

As illustrated in FIG. 7, the removal unit 44 is provided with the second detector 70 that detects the vibration propagated from the transporting belt 21 to the blade 43. Each of a plurality of the second detectors 70 is provided at a position corresponding to a respective one of the plurality of regions BA1 to BAN. That is, the removal unit 44 is provided with the N second detectors 70 that detect the load of the blade 43 for each of the N regions BA1 to BAN. The plurality (N) of the second detectors 70 including a second detector 71 and a second detector 72 different from the second detector 71 are provided. When the number of the second detectors 70 is N, the N second detectors 70 include the second detector 71, the second detector 72 . . . and a Nth detector 7N.

The control unit 100 performs adjustment of the blade 43 or determination of abnormality of the transporting belt 21 based on the detection results of the detectors 60 and 70. The control unit 100 determines whether there is a region of the blade 43 to be adjusted or a region of the transporting belt 21 having abnormality based on the detection results of the detectors 60 and 70. Then, the control unit 100 causes the display unit 14 to display the region to be adjusted or the region having abnormality among the plurality of regions based on the determination results. In the present example, the control unit 100 determines whether there is a corresponding region with respect to both the region of the blade 43 to be adjusted and the region of the transporting belt 21 having the abnormality based on the detection results of the detectors 60 and 70. Then, the control unit 100 causes the display unit 14 to individually display both the region of the blade 43 to be adjusted and the region of the transporting belt 21 having the abnormality among the plurality of regions, based on the determination results.

Specifically, the control unit 100 causes the display unit 14 to display information indicating a region where the pressing force of the blade 43 is excessive or deficient, based on the load detection result for each of the plurality of regions BA1 to BAN by the plurality of first detectors 61, 62 . . . and 6N, respectively. The control unit 100 causes the display unit 14 to display information indicating deterioration or a deterioration degree of the adhesive layer 25 for each region based on the vibration detection result for each of the plurality of regions BA1 to BAN by the plurality of second detectors 70.

In the removal unit 44, the light-emitting unit 80 is provided in a portion corresponding to each region of the plurality of regions BA1 to BAN. The control unit 100 (see FIGS. 2 and 9) turns on or blinks a light-emitting unit 80 corresponding to the region of the blade 43 to be adjusted or the region of the transporting belt 21 having the abnormality according to the determination result based on the detection result in each region of the plurality of regions BA1 to BAN by the plurality of detectors 60 and 70. The user can be notified of the region of the blade 43 to be adjusted or the region of the transporting belt 21 having the abnormality (for example, a region having a high deterioration degree) among the plurality of regions BA1 to BAN by turning on or blinking the light-emitting unit 80.

The removal unit 44 is provided with a plurality of marks 90 by which the regions BA1 to BAN can be distinguished, each of the plurality of marks 90 being at a position corresponding to a region of a respective one of the plurality of regions BA1 to BAN. In the present example, each of the plurality of marks 90 is provided in a portion corresponding to a respective one of the regions BA1 to BAN of the blade 43. A region corresponding to the mark 90 among the plurality of regions BA1 to BAN can be distinguished by a difference in contents in each of the plurality of marks 90. In the examples illustrated in FIGS. 7 and 8, the mark 90 is, for example, a number. The mark 90 is not limited to the number but may be an alphabet or any other contents by which a region can be identified.

Based on the detection results of the plurality of first detectors 61 to 6N, it is determined whether there is the region of the blade 43 to be adjusted by the control unit 100. When there is the region of the blade 43 to be adjusted, the user is notified of the region of the blade 43 to be adjusted by turning on or blinking of the light-emitting unit 80 and the information of the mark 90 of the corresponding region displayed on the display unit 14. Based on the detection results of the plurality of second detectors 71 to 7N, it is determined whether there is the abnormal region of the transporting belt 21 having a high deterioration degree by the control unit 100. When there is the abnormal region of the transporting belt 21 having the high deterioration degree, the user is notified of the abnormal region by turning on or blinking of the light-emitting unit 80 and the information of the mark 90 of the corresponding region displayed on the display unit 14.

Thus, the user can be informed of which region is the region of the blade 43 to be adjusted or the abnormal region that is the region of the transporting belt 21 having the high deterioration degree from the information regarding the mark 90 displayed on the display unit 14. Then, in the removal unit 44, the user can identify the region of the blade 43 to be adjusted or the abnormal region that is the region of the transporting belt 21 having the high deterioration degree by a position where the mark 90 having the same contents as the reported mark 90 is present or a position where the light-emitting unit 80 is turned on or blinked.

Figure 8:
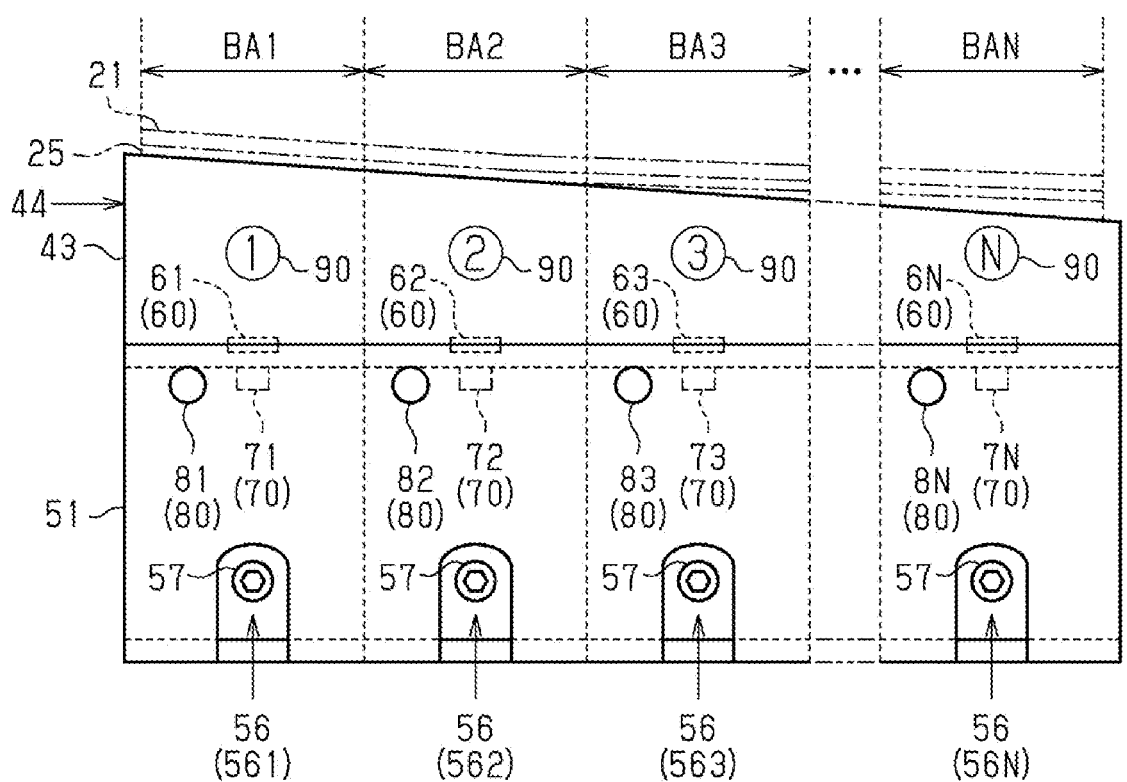
FIG. 8 is a schematic front view illustrating the removal unit when a blade is in a one sided contact state.

For example, as illustrated in FIG. 8, when the blade 43 is mounted in an inclined posture with different heights at both end portions in the width direction X, the one sided contact occurs in which the blade 43 comes into excessively strong contact with the adhesive layer 25 at a portion closer to one end in the width direction X (closer to the left end in FIG. 8). When this kind of one sided contact occurs, a region of the adhesive layer 25 with which the blade 43 comes into excessively strong contact deteriorates early. For example, in FIG. 8, in two regions BA1 and BA2 on the left end side of the blade 43, the blade 43 is in excessively strong contact with the transporting belt 21. In this case, for example, the number that is the contents of the mark 90 is displayed on the display unit 14, and two light-emitting units 81 and 82 corresponding to the two regions BA1 and BA2, respectively, in FIG. 8 are turned on or blinked. Accordingly, the user can relatively easily identify the region of the blade 43 to be adjusted or the abnormal region that is the region of the transporting belt 21 having the high deterioration degree from among the plurality of regions BA1, BA2 . . . and BAN.

Electrical Configuration of Printing Apparatus 11

Next, an electrical configuration of the printing apparatus 11 will be described with reference to FIG. 9.

Figure 9:
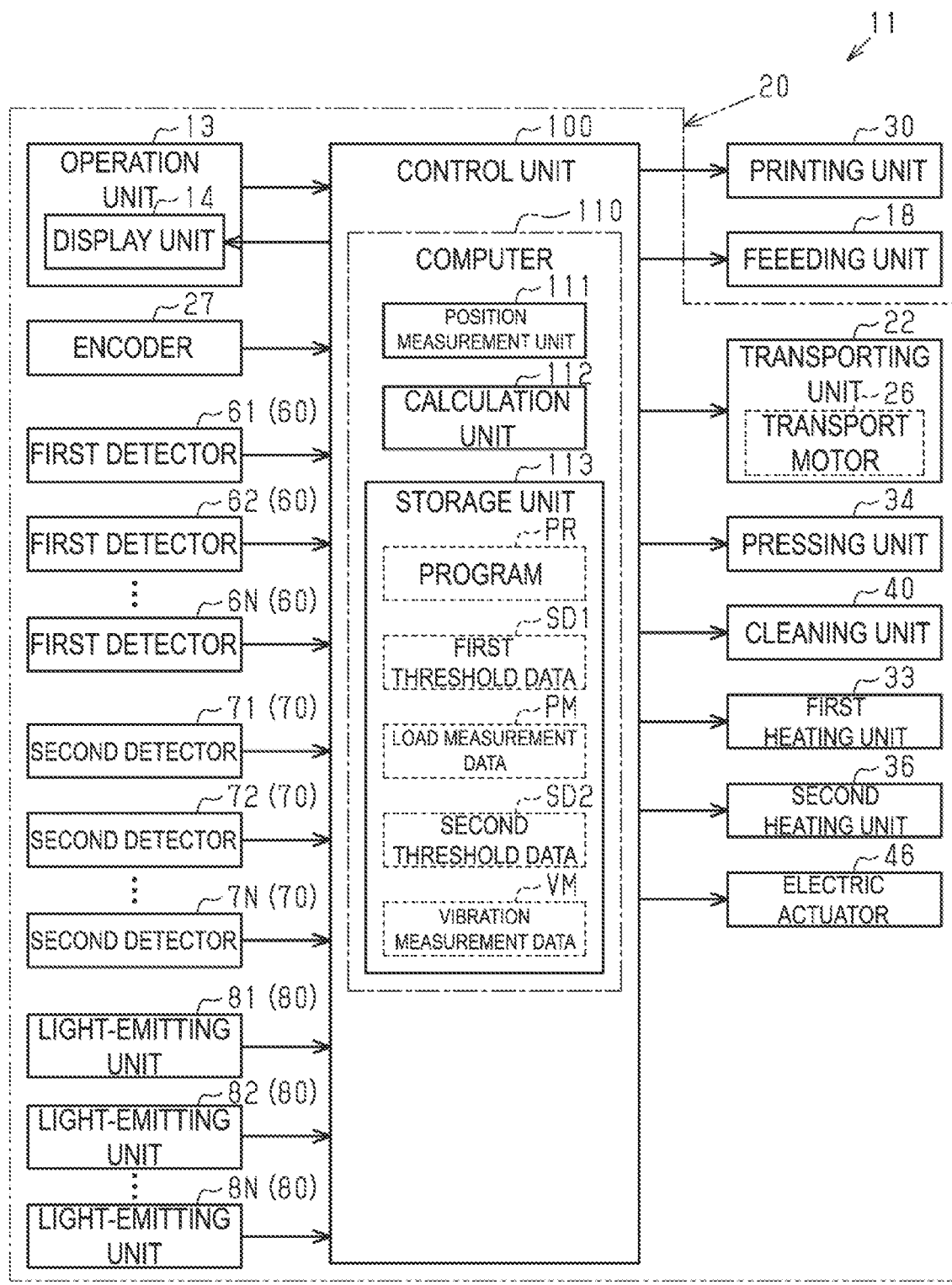
FIG. 9 is a block diagram illustrating an electrical configuration of the printing apparatus.

As illustrated in FIG. 9, the printing unit 30, the feeding unit 18, and components of the transport device 20 are electrically coupled to the control unit 100. As illustrated in FIG. 9, the components of the transport device 20 includes the transporting unit 22, the pressing unit 34, the cleaning unit 40, the first heating unit 33, and the second heating unit 36. Control targets electrically coupled to the control unit 100 are as follows.

The control targets are the ejection unit 31 constituting the printing unit 30 and a feeding motor (not illustrated) that is a driving source of the feeding unit 18. When the printing unit 30 is a serial printing type, a carriage motor (not illustrated) that is a driving source of the carriage 32 is also the control target.

In addition, the control target includes the transport motor 26 that is a driving source of the transporting unit 22, a driving source (for example, a motor) of the pressing unit 34, and for example, a motor (not illustrated) that is a driving source of the brush 42 constituting the cleaning unit 40. Further, the control targets include the heater 33A constituting the first heating unit 33, a heater (not illustrated)

constituting the second heating unit 36, and the electric actuator 46 that is a driving source of the elevating mechanism 45. Note that the elevating mechanism 45 can adjust the position of the blade 43 in the vertical direction Z by being driven up and down. The elevating mechanism 45 includes the electric actuators 46 at two or more different positions in the width direction X. For example, the electric actuator 46 may be used to adjust the position of the blade 43 in the vertical direction Z. The electric actuator 46 may constitute a part of the adjustment unit together with the adjustment unit 56 of an operation type, or an adjustment unit of an electric type including the electric actuator 46 may be used instead of the adjustment unit 56 of the operation type.

The operation unit 13 and the display unit 14 are electrically coupled to the control unit 100. When the display unit 14 is the touch panel, an operation function thereof may also serve as the operation unit 13. The control unit 100 inputs an operation signal from the operation unit 13 operated by the user. The display unit 14 has a notification function in which notification is performed by displaying information. The control unit 100 causes the display unit 14 to display information for the notification. The control unit 100 causes the display unit 14 to display information of the region of the blade 43 to be adjusted, the abnormal region such as the region of the transporting belt 21 having the high deterioration degree, information of an adjustment amount, and the like. The control unit 100 also causes the display unit 14 to display information such as a menu screen, a print progress status, and the like.

An encoder 27 that detects a rotation of the transport motor 26 or the driving roller 23A is electrically coupled to the control unit 100. The encoder 27 outputs a detection signal including the number of pulses proportional to the rotation amount of the transport motor 26 or the driving roller 23A.

The detectors 60 and 70 provided in the removal unit 44 are electrically coupled to the control unit 100. Specifically, the N first detectors 60 (61, 62 . . . and 6N) and the N second detectors 70 (71, 72 . . . and 7N) are electrically coupled to the control unit 100.

The first detector 60 is, for example, the pressure sensor, the strain sensor, or the like. The second detector 70 is, for example, the acceleration sensor, the gyro sensor (angular velocity sensor), or the like. Here, the acceleration sensor may be any one of a frequency change type, a piezoelectric type, a piezoresistive type, and an electrostatic capacitance type. The gyro sensor may be, for example, a vibration gyro sensor. The vibration gyro sensor may use either a piezoelectric vibrator or a crystal oscillator.

For example, N light-emitting units 80 (81, 82 . . . and 8N) provided in the removal unit 44 are electrically coupled to the control unit 100. The control unit 100 determines whether there is the region of the transporting belt 21 having the abnormality based on each of the detection results of the first detector 60 and the second detector 70. When there is an abnormal region based on the determination result, the control unit 100 turns on or blinks a light-emitting unit 80 corresponding to the abnormal region among the plurality of light-emitting units 80. The light-emitting unit 80 is formed of, for example, an LED. The light-emitting unit 80 may include a plurality of the LEDs having different emission colors. In this case, the emission color of the light-emitting unit 80 may be changed depending on the type of abnormality for the notification. For example, the light emission color of the light-emitting unit 80 may be different between a case where there is a region to be adjusted due to excess or deficiency of the load of the blade 43 and a case where there is the region of the transporting belt 21 having the high deterioration degree.

The control unit 100 includes a computer 110. The computer 110 includes a position measurement unit 111, a calculation unit 112, and a storage unit 113. The position measurement unit 111 measures a belt rotation position that is a position during one rotation of the transporting belt 21. That is, when a predetermined position during one rotation of the transporting belt 21 is set as a reference position, the position measurement unit 111 measures a belt rotation position indicating at which position in one rotation a position on the transporting belt 21 passing through the reference position is located. In the present example, a position at which the first detector 60 starts a load detection operation of detecting the load of the blade 43 is set as the reference position. Furthermore, a position at which the second detector 70 starts a vibration detection operation of detecting the vibration of the blade 43 is set as the reference position. The reference position at which the first detector 60 starts the load detection operation and the reference position at which the second detector 70 starts the vibration detection operation may be the same position (belt rotation position). The position measurement unit 111 measures a position of the transporting belt 21 during one rotation of the transporting belt 21 as the belt rotation position, with a reference position that is a position of the transporting belt 21 as an origin when the detectors 60 and 70 start the detection operation.

Specifically, the position measurement unit 111 includes a counter that counts, for example, the number of pulse edges of the pulse signal input from the encoder 27. The control unit 100 resets a count value of the counter when the detectors 60 and 70 start the detection operation. Then, the control unit 100 causes the counter to start counting, with a position (belt rotation position) on the transporting belt 21 that comes into contact with the blade 43 at the wiping position WP when the control unit 100 starts the detection operation as the origin.

The control unit 100 acquires the load detection result of the blade 43 detected by the first detector 60 during one rotation of the transporting belt 21. That is, the load detection result of the blade 43 for one rotation of the transporting belt 21 is acquired so that the excess or deficiency between the regions BA1 to BAN of the pressing force of the blade 43 for one rotation of the transporting belt 21 can be inspected. The control unit 100 acquires the vibration detection result of the blade 43 detected by the second detector 70 during one rotation of the transporting belt 21. That is, the vibration detection result of the blade 43 for one rotation of the transporting belt 21 is acquired so that the deterioration degree of the adhesive layer 25 for one rotation of the transporting belt 21 can be inspected.

As illustrated in FIG. 9, a program PR is stored in the storage unit 113. The program PR includes at least a program illustrated in a flowchart in FIG. 15. The computer 110 in the control unit 100 executes a belt inspection process illustrated in FIG. 15 by executing the program PR.

The storage unit 113 stores first threshold value data SD1 used by the control unit 100 to determine whether there is the region of the blade 43 to be adjusted in the belt inspection process. The storage unit 113 includes a storage region for storing load measurement data PM obtained by the control unit 100 causing the first detector 60 to measure the load received by the blade 43 in the belt inspection process. The first threshold value data SD1 includes an upper threshold value SD1U and a lower threshold value SD1L of an appropriate range in which the load of the blade 43 need not be adjusted. For example, the upper limit value SD1U and the lower limit value SD1L may be set for each heating temperature corresponding to the heating temperature at which the first heating unit 33 heats the adhesive layer 25.

The calculation unit 112 calculates the load of the blade 43 based on the detection value of the first detector 60. Then, the control unit 100 compares the load with each of the upper threshold value SD1U and the lower threshold value SD1L corresponding to the heating temperature at that time. When the load deviates from the appropriate range between the upper limit value SD1U and the lower limit value SD1L at that time, the control unit 100 determines that a region corresponding to the first detector 60 that has detected the load at that time is the region of the blade 43 to be adjusted. When the detected load value exceeds the upper limit value SD1U, the control unit 100 acquires the adjustment amount in a direction (−direction) in which the pressing force is reduced based on an amount by which the load value at that time exceeds the upper limit value SD1U. When the detected load value falls below the lower limit value SD1L, the control unit 100 acquires the adjustment amount in a direction (+direction) in which the pressing force is increased based on an amount by which the load value at that time falls below the lower limit value SD1L.

The storage unit 113 stores second threshold value data SD2 used by the control unit 100 to determine whether there is the region of the transporting belt 21 having the abnormality in the belt inspection process. The storage unit 113 includes a storage region for storing vibration measurement data VM obtained by the control unit 100 causing the second detector 70 to measure the vibration received by the blade 43 in the belt inspection process.

In the second threshold value data SD2, a plurality of threshold values SH1, SH2 . . . and SHN each corresponding to a respective one of the heating temperatures are set for the respective one of the heating temperature at which the first heating unit 33 heats the adhesive layer 25. The calculation unit 112 calculates vibration intensity based on the vibration detection result (vibration detection value) obtained by detecting the vibration of the blade 43 by the second detector 70. Then, the control unit 100 determines whether the adhesive layer 25 has deteriorated by comparing the vibration intensity with a threshold value SHk (where the subscript k is a natural number N or less) corresponding to the heating temperature at that time. The calculation unit 112 calculates the deterioration degree of the adhesive layer 25 based on a ratio between the vibration intensity and the threshold value SHk corresponding to the heating temperature at that time. The control unit 100 acquires the deterioration degree of the adhesive layer 25 for each of the regions BA1, BA2 . . . and BAN. When there is a region where the deterioration degree falls below the threshold value SHk corresponding to the heating temperature at that time, the control unit 100 determines that a portion of the region of the adhesive layer 25 is deteriorated. In this way, the control unit 100 performs the determination regarding the deterioration of the adhesive layer 25 and the acquisition of the deterioration degree for each region based on the detection result of the second detector 70. Here, the vibration intensity is not limited to an amplitude, but is a physical quantity that can be used for determining the deterioration of the adhesive layer 25 and is a physical quantity that can be calculated from the detection result of the second detector 70. An appropriate physical quantity may be adopted in accordance with the type of the second detector 70.

When the control unit 100 determines that there is the abnormal region among the plurality of regions BA1 to BAN of the transporting belt 21 based on the detection results of the detectors 60 and 70, the control unit 100 causes the display unit 14 to display information indicating the region of the transporting belt 21 having the abnormality. For example, the control unit 100 causes the display unit 14 to display information of the mark 90 corresponding to the region of the transporting belt 21 having the abnormality. In addition, the control unit 100 causes the display unit 14 to display the adjustment amount by the adjustment unit 56 corresponding to the region of the transporting belt 21 having the abnormality. Based on the detection result of the first detector 60, the control unit 100 identifies a region where the load is excessive or deficient as the region of the transporting belt 21 having the abnormality and identifies an amount of excess or deficiency or an amount by which the excess or deficiency is to be reduced for each region, and displays information indicating the identified region and the amount on the display unit 14. When the control unit 100 determines that there is a region where the blade 43 is in contact with transporting belt 21 in an abnormal manner, the control unit 100 identifies the adjustment unit 56 corresponding to the region of the transporting belt 21 having the abnormality among the plurality of adjustment units 56 and causes the display unit 14 to display information prompting adjustment by the adjustment unit 56. The control unit 100 turns on or blinks a light-emitting unit 80 corresponding to the region of the transporting belt 21 having the abnormality among the plurality of light-emitting units 80.

Load Measurement by First Detector 60

Load measurement will be described with reference to an example in which a pressure sensor is used as the first detector 60. The pressure sensor detects a pressure received by the blade 43 from the transporting belt 21 and outputs a detection signal having a voltage value corresponding to the value of the detected pressure. The control unit 100 detects the pressure as the load based on the detection signal input from the first detector 60. Here, the pressure detected by the first detector 60 corresponds to a load per unit area received by the blade 43 from the transporting belt 21. Thus, the calculation unit 112 calculates the load of the blade 43 by using the detected pressure value as the load per unit area or by multiplying the detected pressure value by a predetermined region of a portion of the blade 43 that receives the load. The control unit 100 measures the load during one rotation of the transporting belt 21 based on the detection signal input from the first detector 60.

Figure 10:
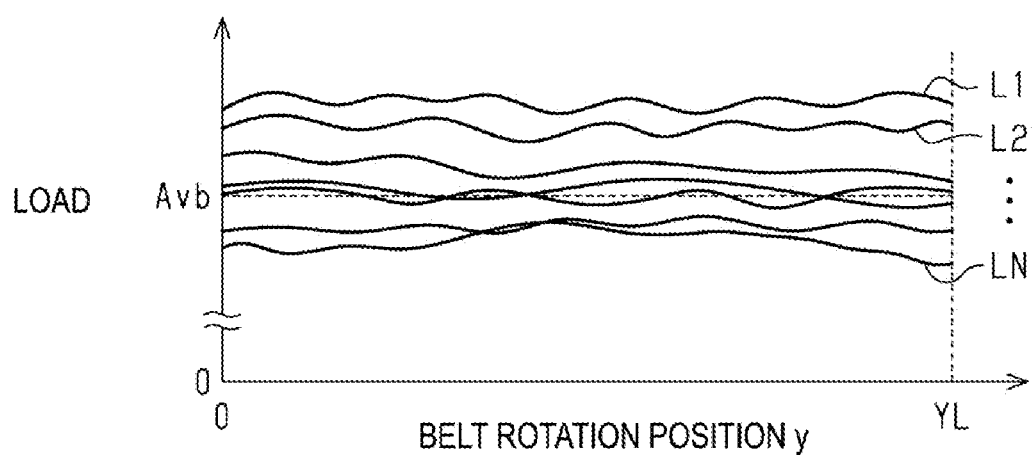
FIG. 10 is a graph showing a load detection result of the blade for one round of the transporting belt for each region.

FIG. 10 is a graph schematically showing the loads of the blade 43 measured during one rotation of the transporting belt 21. The horizontal axis represents a belt rotation position y, and the vertical axis represents the load. In the belt rotation position y, "0" represents an origin that is a position on the transporting belt 21 located at the wiping position WP when the detection operation starts. A belt rotation position YL corresponds to a belt rotation position when the origin of the transporting belt 21 rotates once and reaches the wiping position WP again.

As can be seen from the graph in FIG. 10, the load received by the blade 43 varies during one rotation of the transporting belt 21. As the pressing force with which the blade 43 presses the front surface 25A of the transporting belt 21 is larger, the load received by the blade 43 increases. In other words, the load increases at a position where the pressing force with which the blade 43 presses the front surface 25A of the transporting belt 21 is large, and the load decreases at a position where the pressing force with which the blade 43 presses the front surface 25A of the transporting belt 21 is small. In the example illustrated in FIG. 10, as can be seen from graph lines L1, L2 . . . and LN for regions BA1, BA2 . . . and BAN, respectively, there is excess or deficiency in the value of the load depending on the regions BA1, BA2 . . . and BAN. Noted that the loads in the regions BA1 and BA2 relatively greatly deviate from a load average value Avb obtained by averaging the load for each of the regions BA1, BA2 . . . and BAN. That is, in the example illustrated in FIG. 10, the detection values of the loads in the regions BA1 and BA2 are excessive with respect to the load average value Avb. Note that the load average value Avb is an example of a target value of a load to be satisfied in each of the regions BA1, BA2 . . . and BAN. A value determined in advance by an experiment, evaluation, or the like may be used as the target value of the load instead of the load average value Avb. Assuming that the load average value Avb is 20 N, for example, when the load in the region BA1 is 25 N, the load is excessive by +5 N, and thus the control unit 100 displays the region BA1 as the identified region and +5 N as the information indicating the amount of excess or deficiency on the display unit 14. Alternatively, an amount by which the excess or deficiency is to be reduced is −5 N in this case, and thus the control unit 100 displays the region BA1 as the identified region and −5 N as the information indicating the amount by which the excess or deficiency is to be reduced on the display unit 14. The control unit 100 performs the same control on regions other than the region BA1. In this way, the control unit 100 identifies the amount of excess or deficiency or the amount by which the excess or deficiency is to be reduced by calculating the difference between the load average value Avb and the detection value of the load for each of the regions BA1, BA2 . . . and BAN. The control unit 100 may display a sign (alphabet or level), instead of the numerical value, corresponding to the load indicating the amount of the excess or deficiency or the amount by which the excess or deficiency is to be reduced on the display unit 14.

Figure 11:
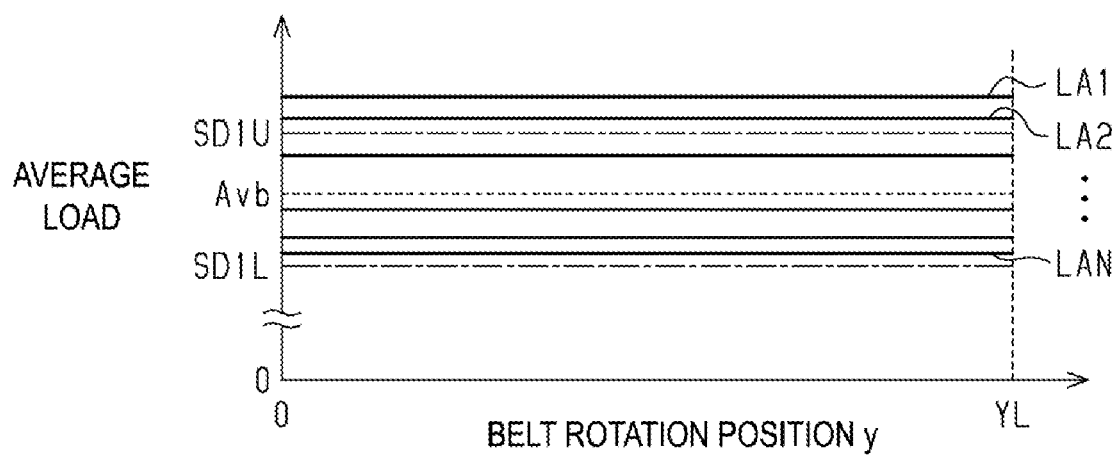
FIG. 11 is a graph showing an average load of the blade for one round of the transporting belt for each region.

FIG. 11 is a graph obtained by calculating the average value of the load for one rotation for each of the regions BA1, BA2 . . . and BAN from the load of the blade 43 measured during one rotation of the transporting belt 21 illustrated in FIG. 10. As can be seen from the graph lines LA1 to LAN for the regions, BA1, BA2 . . . and BAN, respectively, in this graph, the average load for each of the regions BA1, BA2 . . . and BAN differs depending on the position of the transporting belt 21 in the width direction X. In the example illustrated in FIG. 11, there is excess or deficiency in the value of the average load depending on the regions BA1, BA2 . . . and BAN. In FIG. 11, the upper threshold value SD1U and the lower threshold value SD1L of the threshold value data SD1 are indicated by dashed-dotted lines so as to sandwich the load average value Avb. In the example illustrated in FIG. 11, the average loads of the two regions BA1 and BA2 exceed the upper threshold value SD1U. There is no region where the average load falls below the lower threshold value SD1L.

Figure 12:
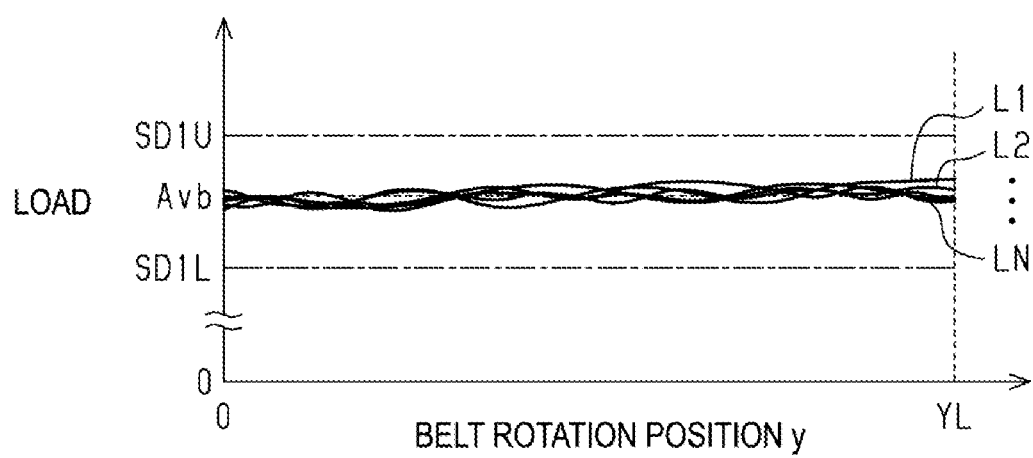
FIG. 12 is a graph showing a load detection result of the blade for one round of the transporting belt after adjustment for each region.

FIG. 12 is a graph showing a result in which the control unit 100 re-measures the load for each of the regions BA1, BA2 . . . and BAN after the adjustment by the adjustment unit 56. When the control unit 100 receives an input from the user indicating that the adjustment by the adjustment unit 56 has been completed by operating the operation unit 13, the control unit 100 performs the detection operation and re-measures the load for each of the regions BA1, BA2 . . . and BAN. As a result of the re-measurement, as illustrated in FIG. 12, all of the average loads for the regions BA1, BA2 . . . and BAN fall within the appropriate range between the upper threshold value SD1U and the lower threshold value SD1L. Then, the control unit 100 determines that the pressing force of the blade 43 is adjusted into a normal state in which the excess or deficiency, that is, the variation, among the regions BA1, BA2 . . . and BAN is reduced. That is, in the plurality of regions BA1, BA2 . . . and BAN, the difference between the detection value of the load (the detection result of the first detector 60) and the target value of the load falls within the appropriate range.

Vibration Measurement of Second Detector 70

Next, with reference to FIGS. 13 and 14, vibration measurement will be described with reference to an example in which an acceleration sensor is used as the second detector 70. The acceleration sensor detects an acceleration of vibration and outputs a detection signal having a voltage value corresponding to a value of the detected acceleration. The control unit 100 measures vibration acceleration during one rotation of the transporting belt 21 based on the detection signal input from the second detector 70.

Figure 13:
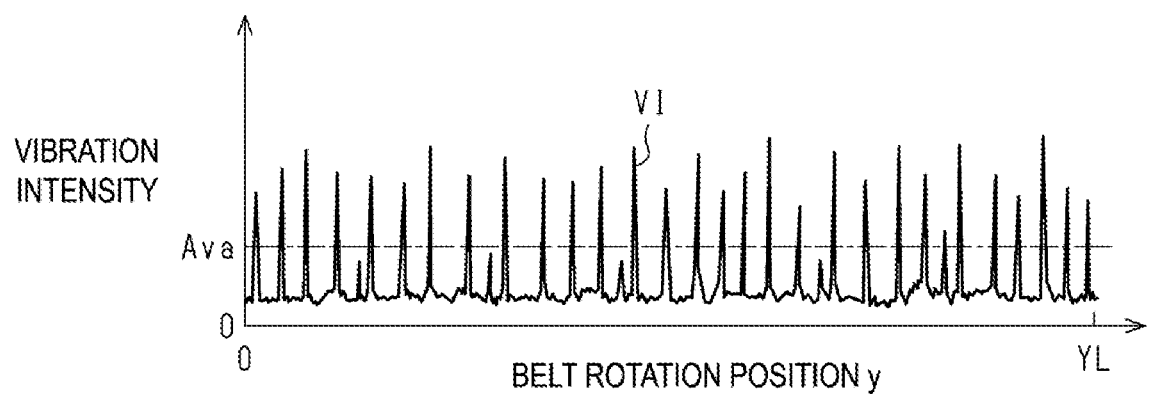
FIG. 13 is a graph showing a vibration detection result of the blade for one rotation amount of the transporting belt.

FIG. 13 is a graph schematically showing the vibration acceleration of the transporting belt 21 measured during one rotation of the transporting belt 21. The horizontal axis represents the belt rotation position y, and the vertical axis represents a vibration intensity Av. In the present example in which an acceleration sensor is used as the second detector 70, the vibration intensity Av is the vibration acceleration. As can be seen from the graph in FIG. 13, a large number of peaks of the large vibration intensity Av are generated during one rotation of the transporting belt 21. As the frictional force between the blade 43 and the adhesive layer 25 is larger, the peak of the vibration acceleration tends to increase. When the adhesive layer 25 is new immediately after replacement, the adhesive force is high, and thus the frictional force between the blade 43 and the adhesive layer 25 is large. As time elapses from the replacement of the adhesive layer 25 (for example, the application of the adhesive), the adhesive force of the adhesive layer 25 gradually decreases. When the adhesive force of the adhesive layer 25 is large, the blade 43 is pulled in the circulating direction CD by the adhesive force of the adhesive layer 25, and a displacement amount Δy displaced in the circulating direction CD increases until the pulled blade 43 is peeled off from the adhesive layer 25. When the pulled blade 43 is peeled off from the adhesive layer 25, the vibration of the blade 43 is generated. As the displacement amount Δy until the blade 43 is peeled off from the adhesive layer 25 is larger, restoring force Fb of the blade 43 increases. That is, as the displacement amount Δy until the blade 43 is peeled off from the adhesive layer 25 is larger, an absolute value |Av| of the vibration acceleration Av increases. Note that "| |" is a symbol indicating the absolute value.

The control unit 100 calculates an average vibration intensity Ava for one rotation of the transporting belt 21. In the present example, when the control unit 100 acquires the measurement data VM of the vibration acceleration for one rotation, the control unit 100 calculates the average vibration acceleration Aav that is the average of the absolute values of the vibration acceleration for one rotation by the calculation unit 112. The average vibration acceleration Aav is used as the average vibration intensity Ava. The control unit 100 determines whether the adhesive layer 25 is deteriorated by comparing the average vibration intensity Ava with the threshold value SH of the threshold value data SD2. Note that when the vibration acceleration is used, both positive and negative accelerations are always generated at the time of vibration, and thus the absolute value of the vibration acceleration is used so that the positive vibration acceleration and the negative vibration acceleration are not canceled cancel each other out when the average value of the vibration acceleration is calculated.

As an example of a method of determining deterioration of the adhesive layer 25, the method in which the average vibration acceleration Aav is used as the average vibration intensity Ava is described. However, the method is not limited thereto, and an appropriate determination method can be adopted. For example, power spectral density (hereinafter also referred to as PSD) may be used to determine whether the adhesive layer 25 is deteriorated. In addition, acceleration spectral density (hereinafter also referred to as ASD) may be also used to determine whether the adhesive layer 25 is deteriorated. Furthermore, power spectral (PS), energy spectral density (ESD), or the like may be used. Also, when the detector 60 is a gyro sensor, similarly, other determination method capable of evaluating the vibration, such as an angular velocity $\omega$, an average angular velocity, of the like can be appropriately employed.

When the control unit 100 determines that the adhesive layer 25 is deteriorated, the control unit 100 causes the display unit 14 that is an example of the notification unit to display information indicating that the adhesive layer 25 is deteriorated, thereby notifying the user of the information.

Figure 14:
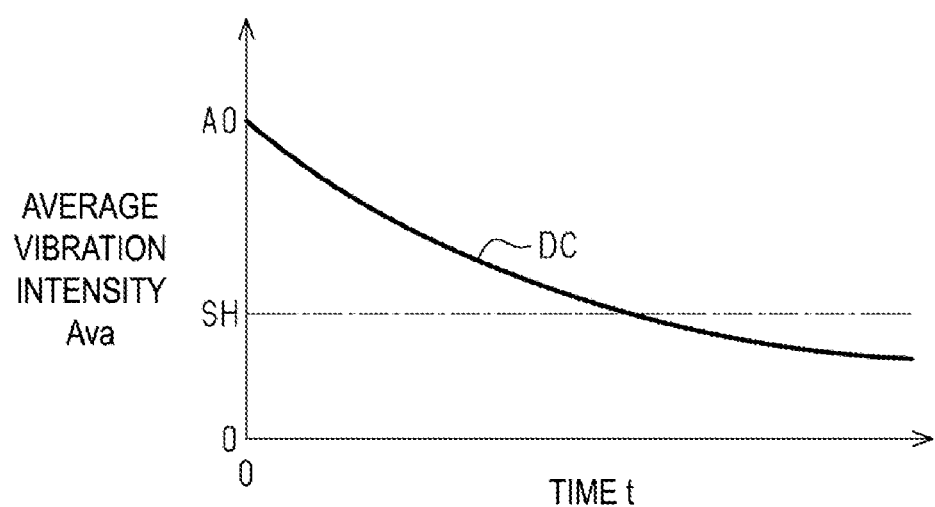
FIG. 14 is a graph showing a relationship between an average vibration intensity of the blade and time.

FIG. 14 is a graph showing how the adhesive layer 25 deteriorates over time. The horizontal axis represents time t elapsed from the time of replacement of the adhesive layer 25, and the vertical axis represents the average vibration intensity Ava. FIG. 14 shows a curve DC in one region among curves each showing the average vibration intensity Ava for a respective one of the regions BA1, BA2 . . . and BAN. In the example in which the vibration intensity is the vibration acceleration, the average vibration intensity Ava is the average vibration acceleration Aav. Here, an initial average vibration intensity A0 when the adhesive layer 25 is replaced is sufficiently higher than the threshold value SH based on the second threshold value data SD2. As time t elapses after printing is performed by the printing apparatus 11, the average vibration intensity Ava gradually decreases and the curve DC is drawn. Then, when the average vibration intensity Ava becomes less than the threshold value SH, the control unit 100 determines that the adhesive layer 25 is deteriorated. Note that in the second threshold value data SD2, the plurality of threshold values SH1, SH2 . . . and SHN corresponding to a respective one of heating temperatures are prepared, and one of the threshold value SHk (where k is a natural number equal to or less than N) corresponding to the heating temperature at that time is selected to be used.

Before the average vibration intensity Ava becomes less than the threshold value SH, the control unit 100 causes the calculation unit 112 to calculate the deterioration degree of the adhesive layer 25 based on the average vibration intensity Ava. The calculation unit 112 calculates the deterioration degree for each of the regions BA1, BA2 . . . and BAN from the average vibration intensity Ava for respective one of the regions BA1, BA2 . . . and BAN. When there is the excess or deficiency in the deterioration degree among the regions BA1, BA2 . . . and BAN, the control unit 100 determines a region where the deterioration degree deviates from the allowable range as the abnormal region. When the control unit 100 identifies the abnormal region, the control unit 100 causes the calculation unit 112 to calculate the deterioration degree for each abnormal region and an amount of deviation of the deterioration degree of the abnormal region with respect to the average deterioration degree averaged among the regions BA1, BA2 . . . and BAN.

Operations of Embodiment

Next, operations of the transport device 20 and the printing apparatus 11 of the present embodiment will be described.

The user operates and causes the operation unit 13 to execute an inspection of the adhesive layer 25 of the transporting belt 21. Alternatively, the inspection of the adhesive layer 25 may be executed by the control unit 100 at a predetermined time after the power of the printing apparatus 11 is turned on. This inspection may be performed before or after the medium M is set on the transporting belt 21. The inspection may be performed before the transporting belt 21 is heated by the heating units 33 and 36, during the heating, or after the transporting belt 21 is heated to the target temperature.

For example, the inspection regarding the deterioration of the adhesive layer 25 may be performed by rotating the transporting belt 21 before the start of printing after the power of the printing apparatus 11 is turned on. Furthermore, when there is no next printing after the end of printing, the transporting belt 21 may be rotated once or more to perform inspection. The inspection may also be performed during printing. In this case, the inspection may be performed at all times during printing, or may be performed regularly or irregularly.

Hereinafter, an example will be described in which the inspection is performed at least during printing. Note that in the case of the adhesive layer 25 of the heat-sensitive type, it is important whether necessary adhesive force can be obtained under a heating condition. The adhesive layer 25 of the heat-sensitive type changes in the adhesive force of the adhesive layer 25 corresponding to the heating temperature. Thus, when the inspection is performed at a time other than during printing, the inspection may be performed under a constant heating temperature regardless of the type of the medium M. On the other hand, during printing, the heating temperature varies corresponding to the type of the medium M, and thus the adhesive layer 25 is heated at a heating temperature corresponding to the type of the medium M during printing.

The control unit 100 determines the heating temperature at which the adhesive layer 25 is heated by the heating units 33 and 36 based on the information of the type of the medium M to be printed. The heating temperature may be changed by the user operating the operation unit 13. When the control unit 100 performs the inspection, the control unit 100 reads out the threshold value SH corresponding to the actually adopted heating temperature from the storage unit 113 and uses the threshold value SH.

Figure 15:
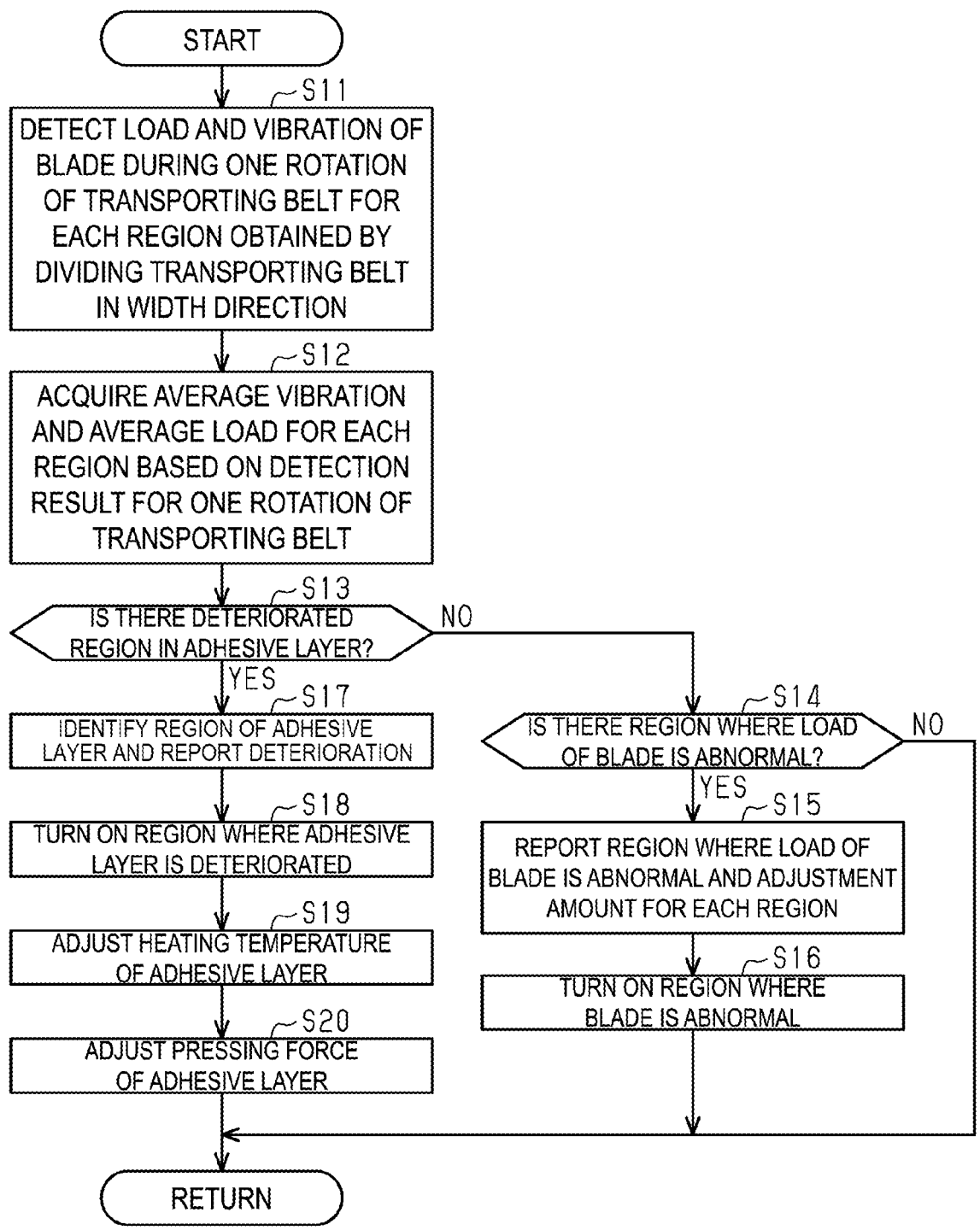
FIG. 15 is a flowchart illustrating a belt inspection processing.

The control unit 100 executes the belt inspection process illustrated in FIG. 15 when the control unit 100 receives an instruction of printing or when the control unit 100 receives an instruction of the inspection by the user operating the operation unit 13. Hereinafter, the belt inspection process will be described with reference to FIGS. 7 to 17 and the like. When the belt inspection process is executed, for example, the adhesive layer 25 is in a state of being heated to a predetermined temperature by the heating units 33 and 36, and the transporting belt 21 is in a state of being rotated in the circulating direction CD.

When the temperature of the adhesive layer 25 rises to the target heating temperature, the control unit 100 executes the belt inspection process illustrated in FIG. 15.

First, in step S11, the control unit 100 detects the load and vibration of the blade 43 during one rotation of the transporting belt 21 for each of the regions BA1 to BAN obtained by dividing the adhesive layer 25 in the width direction X. Specifically, the control unit 100 causes the first detector 60 to detect the load received by the blade 43 and causes the second detector 70 to detect the vibration of the blade 43 until the transporting belt 21 completes one rotation based on the belt rotation position measured by the position measurement unit 111. The plurality of first detectors 61 to 6N detect the load received by the blade 43 for the plurality of regions BA1 to BAN, respectively, of the transporting belt 21. The plurality of second detectors 71 to 7N detect the vibration received by the blade 43 for the plurality of regions BA1 to BAN, respectively, of the transporting belt 21. The control unit 100 acquires the load detection result of the blade 43 and the vibration detection result of the blade 43 for one rotation of the transporting belt for each of the regions BA1 to BAN. For example, the load value for one rotation of the transporting belt shown in the graph in FIG. 10 is acquired for each of the regions BA1, BA2 . . . and BAN. The vibration intensity for one rotation of the transporting belt shown in the graph in FIG. 13 is acquired for each of the regions BA1, BA2 . . . and BAN. Note that when the second detector 70 (71 to 7N) is the acceleration sensor, the vibration intensity may be vibration acceleration or amplitude. When the second detector 70 is the gyro sensor, the vibration intensity may be a vibration angular velocity or a vibration angular acceleration, or may be an average amplitude. As the vibration intensity, for example, the power spectral density (PSD), the acceleration spectral density (ASD), the power spectrum (PS), or the energy spectral density (ESD) may be used.

In the next step S12, the control unit 100 acquires the average load and the average vibration intensity of the blade 43 for each of the regions BA1 to BAN based on the detection result for one rotation of the transporting belt. For example, the average load value shown in the graph in FIG. 11 is acquired for each of the regions BA1, BA2 . . . and BAN. In addition, the average vibration intensity Ava shown in the graph in FIG. 13 is acquired for each of the regions BA1, BA2 . . . and BAN.

In step S13, the control unit 100 determines whether there is a region where the transporting belt 21 is deteriorated in the adhesive layer 25. Specifically, the control unit 100 reads out the threshold value SHk corresponding to the heating temperature of the adhesive layer 25 at that time from the second threshold value SD2 in the storage unit 113. The control unit 100 determines whether there is a region where the average vibration intensity is less than the threshold value SH among the plurality of regions BA1 to BAN. If all of the average vibration intensities for the regions BA1 to BAN are equal to or larger than the threshold value SHk, the control unit 100 determines that there is no region where the adhesive layer 25 is deteriorated, and then proceeds to step S14. On the other hand, if there is a region where the average vibration intensity for the regions BA1 to BAN is less than the threshold value SHk, the control unit 100 determines that there is a region where the transporting belt 21 is deteriorated, and then proceeds to step S17. Here, the average vibration intensity is a value with which the deterioration degree can be evaluated. As the average vibration intensity smaller, the deterioration degree increases. When the deterioration degree is used, if all of the deterioration degree for the regions BA1 to BAN are equal to or larger than the threshold value of deterioration, then the control unit 100 determines that there is no region where the adhesive layer 25 is deteriorated, and then proceeds to step S14. On the other hand, if there is a region where the deterioration degree for each of the regions BA1 to BAN is less than the threshold of deterioration, then the control unit 100 proceeds to step S17.

In step S14, the control unit 100 determines whether there is a region where the load of the blade 43 is abnormal. For example, as illustrated in FIG. 11, the control unit 100 determines whether there is a region where the average load of the blade 43 deviates from the appropriate region between the upper limit value SD1U and the lower limit value SD1L. In the example illustrated in FIG. 11, there are regions BA1 and BA2 in which the average loads of the blade 43 exceed the upper threshold value SD1U, and thus the process proceeds to step S15. On the other hand, if the average loads of the blade 43 are within the appropriate range equal to or larger than the lower threshold value SD1L and equal to or less than the upper threshold value SD1U in all of the regions BA1 to BAN, it is determined that there is no region where the load of the blade 43 is abnormal, and then the routine is ended. Note that if there is one or more regions where the average load of the blade 43 is less than the lower threshold value SD1L, then the process also proceeds to step S15.

Figure 16:
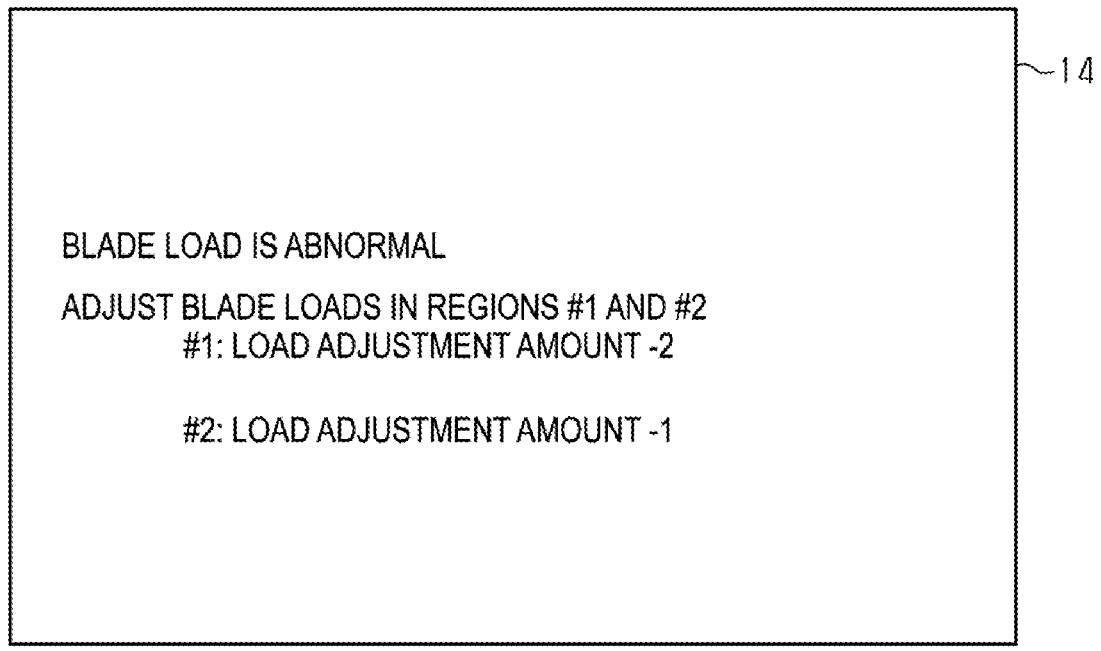
FIG. 16 is a schematic diagram illustrating information of an abnormal region displayed on a display unit.

In step S15, the control unit 100 reports the regions where the load of the blade 43 is abnormal and the adjustment amount for each region. For example, as illustrated in FIG. 16, the control unit 100 causes the display unit 14 to display information indicating that the blade load is abnormal, information indicating the region where the blade 43 is to be adjusted, and information indicating the adjustment amount for each of the regions where the blade 43 is to be adjusted. In the example illustrated in FIG. 16, a message including information indicating that the load of the blade 43 is abnormal, information prompting adjustment of the blade loads in the first and second regions, and information indicating the load adjustment amount for each of the first and second regions is displayed on the display unit 14.

Figure 17:
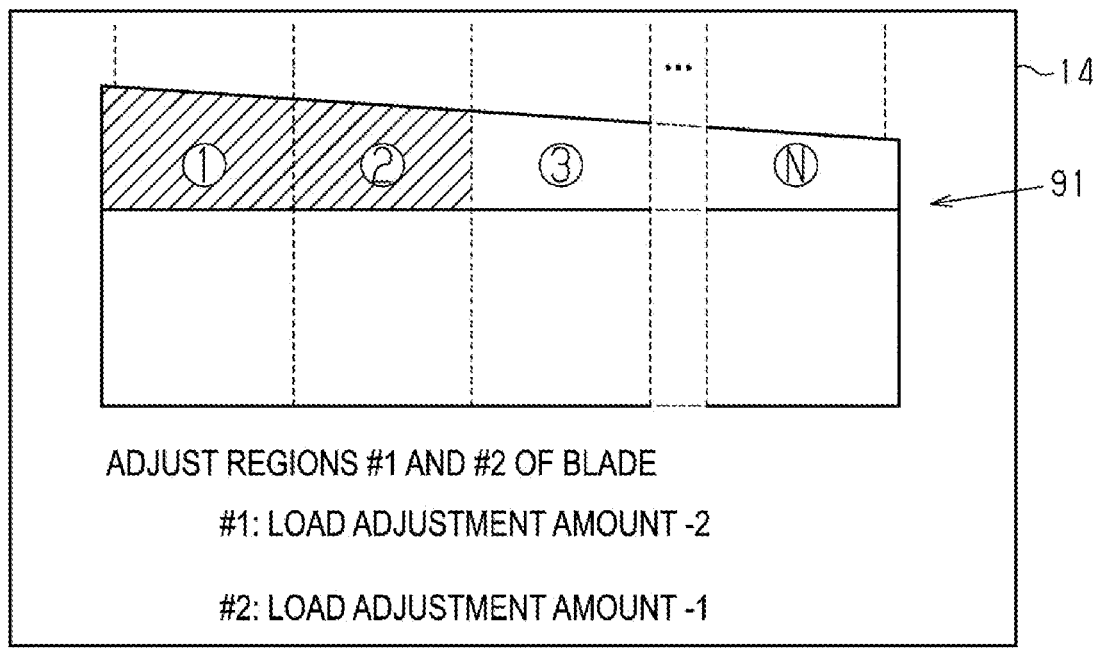
FIG. 17 is a schematic diagram illustrating information of an abnormal region different from the information in FIG. 16 displayed on a display unit.

Further, the control unit 100 may cause the display unit 14 to display contents illustrated in FIG. 17 instead of display contents illustrated in FIG. 16. As illustrated in FIG. 17, the control unit 100 causes the display unit 14 to display a schematic diagram 91 of the removal unit 44. In the schematic diagram 91 of the removal unit 44 displayed on the display unit 14, a region where the blade 43 is to be adjusted due to the one sided contact abnormality of the blade 43 is highlighted (hatched region in FIG. 17).

As illustrated in FIGS. 7 and 8, the marks 90 each capable of individually identifying a respective one of the plurality of regions BA1 to BAN are attached to the blade 43. The mark 90 may be, for example, a mark to which one of characters such as numbers or alphabets different from each other is attached, a mark having one of shapes different from each other, a mark distinguished by color, or a mark that can be identified by a combination of two or more of these marks. The user can visually recognize the region of the blade 43 to be adjusted from the region highlighted by the schematic diagram 91 of the removal unit 44 displayed on the display unit 14 and the mark 90 attached to the highlighted region. Further, on the display unit 14, a message similar to that in FIG. 16 is also displayed below the schematic diagram 91 of the removal unit 44. The message includes information prompting adjustment of the first and second regions of the blade 43 and information of the load adjustment amount to be adjusted in the first and second regions. Thus, the user can be informed of the region of the blade 43 to be adjusted also from the message, and can also be informed of the load adjustment amount for each of the regions to be adjusted. In the example illustrated in FIG. 17, the pressing force with which the blade 43 presses the transporting belt 21 is excessive in the first and second regions. Thus, on the display unit 14, the load adjustment amount of "−2" in a direction (−direction) in which the pressing force is reduced is displayed as the load adjustment amount in the first region, and the load adjustment amount of "−1" in the direction (− direction) in which the pressing force is reduced is displayed as the load adjustment amount in the second region.

In step S16, the control unit 100 turns on a region where the blade 43 is abnormal. That is, the control unit 100 turns on a light-emitting unit 80 corresponding to the abnormal region among the plurality of light-emitting units 80 (81 to 8N) provided in the removal unit 44 for each of the regions BA1 to BAN, respectively. At this time, the control unit 100 may determine the type of abnormality and turn on the light-emitting unit 80 corresponding to the region where the blade 43 is abnormal with a light emission color corresponding to the type of abnormality. Note that the light-emitting unit 80 may be blinked instead of being turned on.

As illustrated in FIG. 8, the blade 43 may be adjusted in a region BAk (subscript k=1 or 2) to which the same mark 90 as the mark 90 of the region BAk to be adjusted displayed on the display unit 14 is attached from among the plurality of marks 90 each including the number or the like attached to the blade 43. In addition, the blade 43 may be adjusted in the regions BA1 and BA2 identified from the positions of the light-emitting units 81 and 82, respectively, that are turned on or blinked from among the plurality of light-emitting units 80. In the examples illustrated in FIGS. 8, 16, and 17, the adjustment units 56 (561 and 562) corresponding to the first and second regions BA1 and BA2 in FIG. 8 are operated to perform adjustment with the adjustment amounts of "−2" and "−1", respectively. When the user finishes the adjustment of the blade 43, the user operates the operation unit 13 to input information indicating that the adjustment of the blade 43 is finished to the printing apparatus 11.

On the other hand, in step S17, the control unit 100 identifies the region of the adhesive layer 25 and displays information indicating that the region is deteriorated on the display unit 14 to notify the user of the information. The control unit 100 causes the display unit 14 to display a message including, for example, information indicating that the adhesive layer 25 is deteriorated, information indicating the region where the adhesive layer 25 is deteriorated, and information prompting replacement of the adhesive layer 25. The control unit 100 may identify a cause of the deterioration of the adhesive layer 25 such as one the sided contact of the blade 43 from a positional relationship of the region where the adhesive layer 25 is deteriorated, and may cause the display unit 14 to display information of the identified cause of the deterioration.

In the next step S18, the control unit 100 turns on the region where the blade 43 is deteriorated. That is, the control unit 100 turns on a light-emitting unit 80 corresponding to the region where the blade 43 is deteriorated among the plurality of light-emitting units 80 (81 to 8N) provided in the removal unit 44 for the regions BA1 to BAN, respectively. At this time, the control unit 100 may determine the type of abnormality and turn on the light-emitting unit 80 corresponding to the region where the adhesive layer 25 is deteriorated with a light emission color according to the type of abnormality. Note that the light-emitting unit 80 may be blinked instead of being turned on.

In the next step S19, the control unit 100 adjusts the heating temperature of the adhesive layer 25. Specifically, the control unit 100 adjusts the heating temperature of the heating units 33 and 36 in a direction in which the adhesive force of the adhesive layer 25 is increased. The control unit 100 increases the heating temperature of the heating units 33 and 36, and thus the temperature of the adhesive layer 25 increases. The increase in the temperature of the adhesive layer 25 increases the adhesive force of the adhesive layer 25. Thus, the medium M can be attached to the front surface 25A of the adhesive layer 25 with a necessary adhesive force even though the adhesive layer 25 is deteriorated. In particular, when the adhesive layer 25 is the heat-sensitive type, the increase rate of the adhesive force due to the temperature increase of the adhesive layer 25 is larger than that of the adhesive layer 25 of the pressure-sensitive type. Thus, the medium M can be attached to the front surface 25A of the adhesive layer 25 with the necessary adhesive force even though there is a region where the adhesive layer 25 is deteriorated. Note that when the adhesive layer 25 is the heat-sensitive type, a higher adhesive force can be easily obtained by the process in step S19 than when the adhesive layer 25 is the pressure-sensitive type.

In the next step S20, the control unit 100 adjusts a pressing force against the adhesive layer 25. Specifically, the control unit 100 performs adjustment in a direction of increasing the pressing force with which the pressing roller 35 of the pressing unit 34 presses the medium M. The control unit 100 increases the pressing force of the pressing roller 35, and thus the pressing force when the pressing unit 34 attaches the medium M to the front surface 25A of the adhesive layer 25 by the pressing roller 35 increases. As a result, the medium M can be attached to the front surface 25A of the adhesive layer 25 with the necessary adhesive force even though there is the region where the adhesive layer 25 is deteriorated. Note that when the adhesive layer 25 is the pressure-sensitive type, a higher adhesive force can be easily obtained by the process in step S20 than when the adhesive layer 25 is the heat-sensitive type.

In this way, the user who sees the message or the like including the information indicating that the adhesive layer 25 is deteriorated, the information indicating the deteriorated region, and the information prompting replacement of the adhesive layer 25 displayed on the display unit 14 stops the operation of the printing apparatus 11. Alternatively, the user waits until the timing when the printing ends and the operation of the printer 11 stops. The user replaces the adhesive layer 25 with a new one in a state in which the operation of the printing apparatus 11 stops.

During the operation of the printing apparatus 11, the blade 43 is hidden in the lower portion of the apparatus, and thus the blade 43 is hard to be seen by the user, and is hard to be noticed only by turning on the light-emitting unit 80. Thus, the display unit 14 is caused to display the information of the region to be adjusted and the information of the abnormal region, allowing the user to first grasp the abnormality or the like. Then, when the user pulls out the cleaning unit 40 to the outside of the apparatus after the operation of the printing apparatus 11 stops (power OFF), the user intensively adjust the load in the region where the light-emitting unit 80 is turned on.

Advantages of Embodiment

According to the exemplary embodiment, the following advantages can be obtained.

(1) The transport device 20 includes the transporting belt 21, the removal unit 44, the plurality of detectors 60 and 70, the display unit 14, at least one adjustment unit 56, and the control unit 100. The transporting belt 21 includes the front surface 25A that supports the medium M, and transport the medium M supported by the front surface 25A in the transport direction Y. The removal unit 44 includes the blade 43 that comes into contact with the front surface 25A and removes the adhering substance adhering to the front surface 25A. The plurality of detectors 60 and 70 detect the force received by the blade 43 from the transporting belt 21 or the change in the force. The display unit 14 displays information. The adjustment unit 56 is configured to adjust the position of the blade 43 relative to the transporting belt 21. The control unit 100 controls driving of the transporting belt 21 and the display unit 14. Each of the plurality of detectors 60 and each of the plurality of detectors 70 are provided corresponding to a respective one of the plurality of regions BA1 to BAN into which the transporting belt 21 is divided in the width direction X intersecting the transport direction Y. When the control unit 100 determines that there is the abnormal region among the plurality of regions BA1 to BAN based on the detection result of the detectors 60 and 70, the control unit 100 causes the display unit 14 to display information indicating the abnormal region.

According to this configuration, the information identifying the region where the transporting belt 21 or the blade 43 is abnormal is displayed on the display unit 14, and thus which region of the transporting belt 21 or the blade 43 is abnormal can be visually and easily grasped. Accordingly, which region of the transporting belt 21 or the blade 43 is to be adjusted can be easily grasped. For example, when the user only knows the abnormality caused by the contact between the transporting belt 21 and the blade 43, a troublesome operation such as circularly moving the transporting belt 21 and an extra time are required until the user finds the region where the transporting belt 21 or the blade 43 is abnormal. In contrast, the region where the transporting belt 21 or the blade 43 is abnormal can be identified and grasped from the information displayed on the display unit 14. Thus, the region where the transporting belt 21 or the blade 43 is abnormal can be dealt with early. For example, the user can bring the region where the transporting belt 21 or the blade 43 is abnormal into the normal state early and appropriately.

(2) The at least one adjustment unit 56 is a plurality of the adjustment units 56. Each of the plurality of adjustment units 56 is provided corresponding to a respective one of the plurality of regions BA1 to BAN of the transporting belt 21. When the control unit 100 determines that there is a region where the blade 43 is in contact with the transporting belt 21 in an abnormal manner, the control unit 100 identifies the adjustment unit 56 corresponding to the region where the blade 43 is in contact with the transporting belt 21 in an abnormal manner among the plurality of adjustment units 56 and causes the display unit 14 to display information prompting adjustment by the adjustment unit 56. According to this configuration, the region where the blade 43 is in contact with the transporting belt 21 in an abnormal manner is identified by the information displayed on the display unit 14. The user can adjust the position of the blade 43 relative to the transporting belt 21 in the region where the adjustment is required by adjusting the adjustment unit 56 corresponding to the identified region where the blade 43 is in contact with the transporting belt 21 in an abnormal manner. Thus, fine adjustment for each region can be performed, and the region where the blade 43 is in contact with the transporting belt 21 in an abnormal manner can be adjusted into a normal region.

(3) The transporting belt 21 includes the adhesive layer 25 to which the medium M is attachable, and is configured to transport the medium M attached to the adhesive layer 25 in the transport direction Y. The blade 43 is configured to come into contact with the front surface 25A of the adhesive layer 25 and removes the adhering substance adhering to the front surface 25A. According to this configuration, the information identifying the region where the transporting belt 21 or the blade 43 is abnormal is displayed, and thus the user can adjust the adjustment unit 56 corresponding to the identified region where the transporting belt 21 or the blade 43 is abnormal. Thus, the position of the blade 43 relative to the transporting belt 21 can be adjusted in the appropriate region where the adjustment is required. For example, a situation in which the deterioration speed of the adhesive layer 25 is increased or a situation in which wiping is inappropriate due to an inappropriate relative position of the blade 43 in contact with the transporting belt 21 can be suppressed.

(4) The plurality of detectors 60 detect the force received by the blade 43 from the transporting belt 21 as the load. Based on the detection result of the first detector 60, the control unit 100 identifies the region where the load is excessive or deficient as the abnormal region and identifies the amount of excess or deficiency or the amount by which the excess or deficiency is to be reduced for each region, and displays information indicating the identified region and amount on the display unit 14.

According to this configuration, the information including the abnormal region where there is excess or deficiency in the load of the blade 43 and the amount of excess or deficiency or the amount by which the excess or deficiency is to be reduced is displayed on the display unit 14, and thus the user can visually and easily grasp at which region of the blade 43 the load is to be adjusted by which amount. Thus, adjustment into a state in which there is no excess or deficiency in the load of the blade 43 can be performed early and appropriately.

(5) Each of a plurality of the at least one adjustment units 56 are provided at a respective one of different positions in the width direction X. The control unit 100 causes the display unit 14 to display the adjustment amount by the adjustment unit 56 corresponding to the abnormal region. According to this configuration, the user can grasp the region where the transporting belt 21 or the blade 43 is abnormal and the adjustment amount at the adjustment position corresponding to the region where the transporting belt 21 or the blade 43 is abnormal from the information displayed on the display unit 14, and thus the user can operate the adjustment unit 56 corresponding to the region where the transporting belt 21 or the blade 43 is abnormal with an appropriate adjustment amount. Thus, the region where the transporting belt 21 or the blade 43 is abnormal can be adjusted into a normal state.

(6) The removal unit 44 is provided with a plurality of marks 90 by which the regions BA1 to BAN can be distinguished, each of the plurality of marks 90 being at a position corresponding to a respective one of the plurality of regions BA1 to BAN. The control unit 100 causes the display unit 14 to display information of the mark 90 corresponding to the region where the transporting belt 21 or the blade 43 is abnormal. According to this configuration, the user can more easily grasp which region of the blade 43 is to be adjusted from the information of the marks 90 displayed on the display unit 14.

(7) The removal unit 44, is provided with the light-emitting unit 80 at each position corresponding to a respective one of the plurality of regions BA1 to BAN. The control unit 100 turns on or blinks a light-emitting unit 80 corresponding to the abnormal region among the plurality of light-emitting units 80. According to this configuration, the information identifying the region where the transporting belt 21 or the blade 43 is abnormal is displayed on the display unit 14, and the light-emitting unit 80 corresponding to the abnormal region of the removal unit 44 is turned on or blinked, and thus the user can more easily grasp which adjustment unit 56 is to be adjusted.

(8) The plurality of detectors include the first detector 60 that detects the load received by the blade 43 from the transporting belt 21. According to this configuration, the region where the load identified from the detection result of the load received by the blade 43 from the transporting belt 21 is abnormal is displayed on the display unit 14, and thus the user can easily grasp which region's load of the blade 43 is to be adjusted.

(9) The plurality of detectors include the second detector 70 that detects the vibration of the blade 43 generated when the transporting belt 21 moves in the transport direction Y. According to this configuration, the abnormal region identified based on the detection result of the vibration received by the blade 43 from the transporting belt 21 is displayed on the display unit 14, and thus the user can easily grasp which region of the blade 43 is to be adjusted.

(10) The printing apparatus 11 includes the transporting belt 21, the printing unit 30, the removal unit 44, the plurality of detectors 60 and 70, the display unit 14, at least one adjustment unit 56, and the control unit 100. The transporting belt 21 includes the front surface 25A that supports the medium M, and transport the medium M supported by the front surface 25A in the transport direction Y. The printing unit 30 performs printing on the medium M transported by the transporting belt 21. The removal unit 44 includes the blade 43 that comes into contact with the front surface 25A and removes the adhering substance adhering to the front surface 25A. The detectors 60 and 70 detect the force received by the blade 43 from the transporting belt 21 or the change in the force. The display unit 14 displays information. The adjustment unit 56 and the position of the blade 43 relative to the transporting belt 21 are configured to be adjustable. The control unit 100 controls driving of the transporting belt 21 and the display unit 14. Each of the plurality of detectors 60 and each of the plurality of detectors 70 are provided corresponding to a respective one of the plurality of regions BA1 to BAN into which the transporting belt 21 is divided in the width direction X intersecting the transport direction Y. When the control unit 100 determines that there is a region where the blade 43 is in contact with the transporting belt 21 in an abnormal manner among the plurality of regions BA1 to BAN based on the detection results of the plurality of detectors 60 and 70, the control unit 100 causes the display unit 14 to display information indicating the region where the blade 43 is in contact with the transporting belt 21 in an abnormal manner.

According to this configuration, the information identifying the region where the blade 43 is in contact with the transporting belt 21 in an abnormal manner among the plurality of regions BA1 to BAN is displayed on the display unit 14, and thus which region of the transporting belt 21 or the blade 43 is to be adjusted can be visually and easily grasped. Thus, the region where the blade 43 is in contact with the transporting belt 21 in an abnormal manner reported by the display unit 14 can be dealt with early. For example, the user adjusts the adjustment unit 56 corresponding to the region where the blade 43 is in contact with the transporting belt 21 in an abnormal manner, and thus the region where the blade 43 is in contact with the transporting belt 21 in an abnormal manner can be brought into the normal state early and appropriately.

Note that the above-described exemplary embodiment may be modified as the following modifications. Furthermore, an appropriate combination of the above-described embodiment and the modifications described below can be used as a further modification, and an appropriate combination of the modifications described below can be used as a further modification.

The second detector 70 as an example of the detector may be provided in the blade 43 itself or may be mounted to the blade holder 51 that supports the blade 43. In the latter case, the second detector 70 may be mounted to the outer wall surface of the blade holder 51 or may be mounted to an extending portion extending from the blade holder 51.

The adjustment unit 56 may be configured to adjust the position of the blade 43 relative to the transporting belt 21 by moving the transporting belt 21 in the vertical direction Z. The adjustment unit 56 may be adjusted by adjusting the positions of the transporting belt 21 and the adhesive layer 25 with respect to the blade 43 by a transporting belt moving mechanism (not illustrated). The transporting belt moving mechanism as an example of the adjustment unit 56 is a mechanism that moves the transporting belt 21 in the vertical direction Z together with the driving roller 23A and the driven roller 23B. The adjustment unit 56 includes, for example, an elevating mechanism for moving the driving roller 23A and the driven roller 23B in the vertical direction Z. The elevating mechanism includes, for example, a ball screw and a motor that rotationally drives the ball screw. The configuration of the elevating mechanism is not particularly limited as long as the transporting belt 21 can be moved in the vertical direction Z. When the control unit 100 determines that the adhesive layer 25 is deteriorated, the positions of the transporting belt 21 and the adhesive layer 25 with respect to the blade 43 may be adjusted in the vertical direction Z by the transporting belt moving mechanism (not illustrated). As a result, the pressing force with which the adhesive layer 25 is pressed against the blade 43 is adjusted. The adjustment unit 56 may be configured to adjust the inclination angle of the lower surface portion 24c of the transporting belt 21 with respect to the horizontal plane by individually adjusting the height positions of the transporting belt 21 at both ends in the width direction X. In this case, the adjustment to eliminate the one sided contact of the blade 43 with the transporting belt 21 can be performed by adjusting the inclination angle of the lower surface portion 24c of the transporting belt 21.

The adjustment unit 56 need not be provided corresponding to each region of the plurality of regions BA1, BA2 . . . and BAN. When the number of regions where the detectors 60 are provided is N, that is, when the number of the detectors 60 is N, the number of the adjustment units 56 may be less than N or larger than N. The number of the adjustment units 56 may be one when the number is less than N. For example, the adjustment unit 56 may be configured to adjust the pressing force with which the blade 43 presses the front surface 25A of the transporting belt 21 by moving the blade 43 in parallel while maintaining the blade 43 in a horizontal posture.

The detector may detect the force received by the blade 43 from the transporting belt 21 or the change in the force. As long as this is the case, a detection target of the detector is not limited to the load and the vibration and may be other physical quantities other than the load and the vibration.

The number of the detectors 60 or 70 may be different from the number of the adjustment units 56. For example, the number of the detectors 60 or 70 may be twice or three times the number of the adjustment units 56, or conversely, the number of the adjustment units 56 may be twice or three times the number of the detectors 60 or 70.

The number of detectors 60 may be different from the number of the detectors 70. For example, the number of detectors 60 may be twice or three times the number of the detectors 70, or conversely, the number of the detectors 70 may be twice or three times the number of the detectors 60.

The period during which the detectors 60 and 70 perform the detection operation may be a period during which the transporting belt 21 rotate only in a partial range of the one rotation of the transporting belt 21 instead of the period during the one rotation of the transporting belt 21. The detectors 60 and 70 may perform the detection operation for a certain position in the one rotation of the transporting belt 21 as the target.

The detector may be only the first detector 60. Each of the first detectors 60 may be provided corresponding to a respective one of the plurality of regions.

The detector may be only the second detector 70.

Each of the second detectors 70 may be provided corresponding to a respective one of the plurality of regions.

The detector may include three or more types including other detectors in addition to the first detector 60 and the second detector 70.

An adjustment mechanism of the adjustment unit 56 may be changed as appropriate. For example, the adjustment unit 56 may include a pressing member capable of moving in the β direction (+β and −β) with respect to the blade holder 51 illustrated in FIG. 6. In this case, the adjustment unit 56 may include a first adjustment mechanism that adjusts the pressing member to a movable state and to an immovable state with respect to the blade holder 51, and a second adjustment mechanism for moving the pressing member in the β direction (+β and −β) under the movable state with respect to the blade holder 51. The first adjustment mechanism may include a first screw for adjustment and the second adjustment mechanism may include a second screw for adjustment. The pressing member may be in a state of being movable with respect to the blade holder 51 by the first screw, and in this state, the position of the blade 43 may be configured to be individually adjusted in the β direction for each region by the second screw.

The transport device 20 may be configured in which the mark 90 is provided and the light-emitting unit 80 is not provided. Conversely, a configuration may be adopted in which the light-emitting unit 80 is provided and the mark 90 is not provided.

The transporting belt 21 constituting the transport device 20 may be configured to not include the adhesive layer 25. The medium M may be adsorbed to the front surface of the transporting belt 21 by a suction force due to a negative pressure, or the medium M may be electrostatically adsorbed to the front surface of the transporting belt 21 by an electrostatic force.

In the transport device 20, the blade 43 may be divided into a plurality of blade members each corresponding to a respective one of the plurality of regions BA1, BA2 . . . and BAN of the transporting belt 21. In this case, each of the plurality of first detectors 61 to 6N may be provided to be capable of detecting a load applied to a respective one of the plurality of blade members constituting the blade 43. Further, each of the plurality of second detectors 71 to 7N may be provided to be capable of detecting vibration applied to a respective one of the plurality of blade members constituting the blade 43.

In step S20, the pressing unit that presses the adhesive layer 25 may be adjusted by a mechanism different from the mechanism that moves the pressing roller 35 in the vertical direction Z. The adjustment of the pressure against the adhesive layer 25 may be performed by adjusting the positions of the transporting belt 21 and the adhesive layer 25 with respect to the pressing roller 35 by the transporting belt moving mechanism (not illustrated). The transporting belt moving mechanism is a mechanism that moves the transporting belt 21 in the vertical direction Z together with the driving roller 23A and the driven roller 23B. The transporting belt moving mechanism includes, for example, an elevating mechanism for moving the driving roller 23A and the driven roller 23B in the vertical direction Z. The elevating mechanism includes, for example, a ball screw and a motor that rotationally drives the ball screw. The configuration of the elevating mechanism is not particularly limited as long as the transporting belt 21 can be moved in the vertical direction Z. When the control unit 100 determines that there is a region where the adhesive layer 25 is deteriorated, the positions of the transporting belt 21 and the adhesive layer 25 with respect to the pressing roller 35 may be adjusted in the vertical direction Z by the transporting belt moving mechanism (not illustrated). As a result, the pressure with which the adhesive layer 25 is pressed against the pressing roller 35 is increased, and the adhesive force of the adhesive layer 25 is increased by an amount of the increased pressure.

The schematic diagram 91 of the removal unit 44 displayed on the display unit 14 is not limited to a two dimensional image illustrated in FIG. 17, and may be a three dimensional image. In short, the schematic diagram 91 may be such that the abnormality occurrence location is visually recognizable.

The determination regarding the deterioration of the adhesive layer 25 performed by the control unit 100 based on the detection result of the detector 60 is not limited to the determination of whether the adhesive layer 25 is deteriorated, and may be configured to determine the deterioration degree of the adhesive layer 25. The control unit 100 may perform both of the determination of whether the adhesive layer 25 is deteriorated and the determination of the deterioration degree.

In addition to the display unit 14, notification may be made by voice or sound. The printing apparatus 11 may include, for example, a speaker, and may report information such as the region to be adjusted or the region where the adhesive layer 25 is deteriorated by voice guidance from the speaker.

The printing apparatus 11 is not limited to a textile printing apparatus that performs printing on the medium M such as fabric, and may be an ink jet printer that performs printing on the medium M such as cut paper or roll paper. The printing apparatus 11 may be a multifunction peripheral including the transport device 20 of a belt type.

The printing apparatus 11 is not limited to a serial printer or a line printer, and may be a lateral printer in which the ejecting unit 31 is movable in two directions of the width direction X and the transport direction Y.

When the printing apparatus 11 is the textile printing apparatus, a dyeing unit that dyes the medium M by immersing the medium M in the liquid such as ink may also be included. The ejecting unit 31 is not limited to an ejecting head of ink jet type and may be a dispenser or the like that ejects the liquid. The printing apparatus 11 may include both of the ejecting unit 31 and the dyeing unit that drops the liquid such as ink onto the medium M.

The transport device 20 provided in a printing apparatus other than the printing apparatus 11 of the inkjet type may be used. For example, a transport device including a transporting belt and installed in a printer including a printing head of a dot impact system may be used. Furthermore, a transport device including a transporting belt and installed in a printer including a printing head of a thermal transfer printing system may be used.

The blade that removes the adhering substance from the transporting belt may be a static electricity removal blade for removing the adhering substance adsorbed on the front surface of the transporting belt by static electricity by removing the static electricity from the transporting belt.

Definition

The expression "at least one" as used herein means "one or more" of the desired options. As an example, the expression "at least one" as used herein means "only one option" or "both of two options" when the number of options is two. As another example, the expression "at least one" as used herein means "only one option" or "any combination of two or more options" when the number of options is three or more.

Technical ideas derived from the above embodiment and modifications of the technical ideas together with operations and advantages thereof will be described below.

(A) A transport device includes a transporting belt including a front surface that supports a medium, the transport device being capable of transporting the medium supported by the front surface in a transport direction, a removal unit including a blade that comes into contact with the front surface to remove an adhering substance adhering to the front surface, a plurality of detectors that detects a force received by the blade from the transporting belt or a change in the force, a display unit that displays information, at least one adjustment unit capable of adjusting a position of the blade relative to the transporting belt, and a control unit that controls driving of the transporting belt and the display unit, wherein each of the plurality of detectors is provided corresponding to a respective one of a plurality of regions into which the transporting belt is divided in a width direction intersecting the transport direction, and when the control unit determines that there is an abnormal region among the plurality of regions based on detection results of the detectors, the control unit causes the display unit to display information indicating the abnormal region.

According to this configuration, the information identifying the region where the transporting belt or the blade is abnormal is displayed on the display unit, and thus which region of the transporting belt or the blade is to be adjusted can be visually and easily grasped. For example, when the user only knows the abnormality caused by the contact between the transporting belt and the blade, a troublesome operation such as circularly moving the transporting belt and an extra time are required until the user finds the region where the transporting belt or the blade is abnormal. In contrast, the region where the transporting belt or the blade is abnormal can also be identified and grasped from the information displayed on the display unit. Thus, the abnormal region can be dealt with early. For example, the user adjusts the adjustment unit corresponding to the identified abnormal region, and thus the region where the transporting belt or the blade is abnormal can be brought into the normal state early and appropriately.

(B) In the above-described transport device, the at least one adjustment unit may be a plurality of the adjustment units, each of the plurality of adjustment units may be provided corresponding to a respective one of the plurality of regions of the transporting belt, and when the control unit determines that there is a region where the blade is in contact with the transporting belt in an abnormal manner, the control unit may identify the adjustment unit corresponding to the abnormal region among the plurality of adjustment units and cause the display unit to display information prompting adjustment by the adjustment unit.

According to this configuration, the user adjusts the adjustment unit corresponding to the region where the blade is in contact with the transporting belt in an abnormal manner, which is identified by the information displayed on the display unit, and thus the position of the blade relative to the transporting belt can be adjusted in the region where the adjustment is required. Thus, fine adjustment for each region can be performed, and the region where the blade is in contact with the transporting belt in an abnormal manner can be adjusted into a normal region.

(C) In the above-described transport device, the transporting belt may include the adhesive layer to which the medium is attachable, the transporting belt may be configured to transport the medium attached to the adhesive layer in the transport direction, and the blade may be configured to come into contact with the front surface of the adhesive layer to remove the adhering substance adhering to the front surface.

According to this configuration, the user adjusts the adjustment unit corresponding to the region where the transporting belt or the blade is abnormal, which is identified by the information displayed on the display unit, and thus the position of the blade relative to the transporting belt can be adjusted in the appropriate region where the adjustment is required. For example, a situation in which the deterioration speed of the adhesive layer is increased or a situation in which wiping is inappropriate due to an inappropriate relative position of the blade in contact with the transporting belt can be suppressed.

(D) In the above-described transport device, the detector may detect the force received by the blade from the transporting belt as the load, and the control unit may identify the region where the load is excessive or deficient as the abnormal region based on the detection results of the plurality of detectors, identify the amount of excess or deficiency or the amount by which the excess or deficiency is to be reduced for the region, and display information indicating the identified region and amount on the display unit.

According to this configuration, the information including the abnormal region where there is excess or deficiency in the load of the blade and the amount of excess or deficiency or the amount by which the excess or deficiency is to be reduced is displayed on the display unit, and thus the user can visually and easily grasp at which region of the blade the load is to be adjusted by which amount. Thus, adjustment into a state in which there is no excess or deficiency in the load of the blade can be performed early and appropriately.

(E) In the above-described transport device, the at least one adjustment unit may be provided in plurality and at positions different from each other in the width direction, and the control unit may cause the display unit to display an adjustment amount by the adjustment unit corresponding to the abnormal region.

According to this configuration, the user can grasp the abnormal region and the adjustment amount at the adjustment position corresponding to the abnormal region from the information displayed on the display unit, and thus the user can operate the adjustment unit corresponding to the region where the transporting belt or the blade is abnormal with an appropriate adjustment amount. Thus, the region where the transporting belt or the blade is abnormal can be adjusted into a normal state.

(F) In the above-described transport device, the removal unit may be provided with the plurality of marks with which the plurality of regions are distinguishable at positions each corresponding to a respective one of the plurality of regions, and the control unit may cause the display unit to display information of the mark corresponding to the abnormal region.

According to this configuration, the user can more easily grasp which region of the blade is to be adjusted from the information of the marks displayed on the display unit.

(G) In the above-described transport device, the removal unit may be provided with the light-emitting unit at each position corresponding to a respective one of the plurality of regions, and the control unit may turn on or blink the light-emitting unit corresponding to the abnormal region among a plurality of the light-emitting units.

According to this configuration, the information identifying the abnormal region is displayed on the display unit, and the light-emitting unit corresponding to the abnormal region of the removal unit is turned on or blinked, and thus the user can more easily grasp which adjustment unit is to be adjusted.

(H) In the above-described transport device, the plurality of detectors may include the first detector that detects the load received by the blade from the transporting belt.

According to this configuration, the region where the load identified from the detection result of the load received by the blade from the transporting belt is abnormal is displayed on the display unit, and thus the user can easily grasp which region's load of the blade is to be adjusted.

(I) In the above-described transport device, the plurality of detectors may include the second detector that detects the vibration of the blade generated when the transporting belt moves in the transport direction.

According to this configuration, the abnormal region identified based on the detection result of the vibration received by the blade from the transporting belt is displayed on the display unit, and thus the user can easily grasp which region of the blade is to be adjusted.

(J) A printing apparatus includes a transporting belt including a front surface that supports a medium, the transporting belt being capable of transporting the medium supported by the front surface in a transport direction, a printing unit that performs printing on the medium transported by the transporting belt, a removal unit including a blade that comes into contact with the front surface to remove an adhering substance adhering to the front surface, a plurality of detectors that detect a force received by the blade from the transporting belt or a change in the force, a display unit that displays information, at least one adjustment unit capable of adjusting a position of the blade relative to the transporting belt, and a control unit that controls driving of the transporting belt and the display unit, wherein each of the plurality of detectors is provided corresponding to a respective one of a plurality of regions into which the transporting belt is divided in a width direction intersecting the transport direction, and when the control unit determines that there is an abnormal region among the plurality of regions based on detection results of the plurality of detectors, the control unit causes the display unit to display information indicating the abnormal region.

According to this configuration, the information identifying the abnormal region among the plurality of regions into which the transporting belt is divided in the width direction is displayed on the display unit, and thus which region of the transporting belt or the blade is to be adjusted can be visually and easily grasped. Thus, the region where the transporting belt or the blade is abnormal reported by the display unit can be dealt with early. For example, the user adjusts the adjustment unit corresponding to the region where the transporting belt or the blade is abnormal, and thus the region where the transporting belt or the blade is abnormal can be brought into the normal state early and appropriately.

What is claimed is:

1. A transport device comprising:
    a transporting belt including a front surface configured to support a medium, the transporting belt being configured to transport the medium supported by the front surface in a transport direction;
    a removal unit including a blade configured to come into contact with the front surface to remove an adhering substance adhering to the front surface;
    a plurality of detectors configured to detect a force received by the blade from the transporting belt or a change in the force;
    a display unit configured to display information;
    at least one adjustment unit configured to adjust a position of the blade relative to the transporting belt; and
    a control unit configured to control driving of the transporting belt and the display unit, wherein
    each of the detectors is provided corresponding to a respective one of a plurality of regions into which the transporting belt is divided in a width direction intersecting the transport direction,
    when the control unit determines that there is an abnormal region among the regions based on detection results of the detectors, the control unit causes the display unit to display information indicating the abnormal region,
    the removal unit is provided with a plurality of marks with which the regions are distinguishable at positions each corresponding to a respective one of the regions, and
    the control unit causes the display unit to display information of the mark corresponding to the abnormal region.

2. The transport device according to claim 1, wherein
    the at least one adjustment unit is a plurality of the adjustment units,
    each of the adjustment units is provided corresponding to a respective one of the regions of the transporting belt, and
    when the control unit determines that there is a region where the blade is in contact with the transporting belt in an abnormal manner, the control unit identifies the adjustment unit corresponding to the abnormal region among the adjustment units and causes the display unit to display information prompting adjustment by the adjustment unit.

3. The transport device according to claim 1, wherein
    the transporting belt includes an adhesive layer to which the medium is attachable, the transporting belt being configured to transport the medium attached to the adhesive layer in the transport direction, and the blade is configured to come into contact with a front surface of the adhesive layer to remove the adhering substance adhering to the front surface.

4. The transport device according to claim 1, wherein
the detectors detect the force received by the blade from the transporting belt as a load and
the control unit
identifies a region where the load is excessive or deficient as the abnormal region based on the detection results of the detectors,
identifies
an amount of excess or deficiency or
an amount by which the excess or deficiency is to be reduced for the region, and
displays information indicating the identified region and amount on the display unit.

5. The transport device according to claim 1, wherein
the at least one adjustment unit is a plurality of the adjustment units,
the adjustment units are provided at positions different from each other in the width direction and
the control unit causes the display unit to display an adjustment amount by the adjustment unit corresponding to the abnormal region.

6. The transport device according to claim 1, wherein
the detectors include a first detector configured to detect a load received by the blade from the transporting belt.

7. The transport device according to claim 1, wherein
the detectors include a second detector configured to detect vibration of the blade generated when the transporting belt moves in the transport direction.

8. A printing apparatus comprising:
a transporting belt including a front surface configured to support a medium, the transporting belt being configured to transport the medium supported by the front surface in a transport direction;
a printing unit configured to perform printing on the medium transported by the transporting belt;
a removal unit including a blade configured to come into contact with the front surface to remove an adhering substance adhering to the front surface;
a plurality of detectors configured to detect a force received by the blade from the transporting belt or a change in the force;
a display unit configured to display information;
at least one adjustment unit configured to adjust a position of the blade relative to the transporting belt; and
a control unit configured to control driving of the transporting belt and the display unit, wherein
each of the detectors is provided corresponding to a respective one of a plurality of regions into which the transporting belt is divided in a width direction intersecting the transport direction,
when the control unit determines that there is an abnormal region among the regions based on detection results of the detectors, the control unit causes the display unit to display information indicating the abnormal region,
the removal unit is provided with a plurality of marks with which the regions are distinguishable at positions each corresponding to a respective one of the regions, and
the control unit causes the display unit to display information of the mark corresponding to the abnormal region.

9. A transport device comprising:
a transporting belt including a front surface configured to support a medium, the transporting belt being configured to transport the medium supported by the front surface in a transport direction;
a removal unit including a blade configured to come into contact with the front surface to remove an adhering substance adhering to the front surface;
a plurality of detectors configured to detect a force received by the blade from the transporting belt or a change in the force;
a display unit configured to display information;
at least one adjustment unit configured to adjust a position of the blade relative to the transporting belt; and
a control unit configured to control driving of the transporting belt and the display unit, wherein
each of the detectors is provided corresponding to a respective one of a plurality of regions into which the transporting belt is divided in a width direction intersecting the transport direction,
when the control unit determines that there is an abnormal region among the regions based on detection results of the detectors, the control unit causes the display unit to display information indicating the abnormal region,
the removal unit is provided with a light-emitting unit at positions each corresponding to a respective one of the regions, and
the control unit turns on or blinks the light-emitting unit corresponding to the abnormal region among a plurality of the light-emitting units.

10. The transport device according to claim 9, wherein
the at least one adjustment unit is a plurality of the adjustment units,
each of the adjustment units is provided corresponding to a respective one of the regions of the transporting belt, and
when the control unit determines that there is a region where the blade is in contact with the transporting belt in an abnormal manner, the control unit identifies the adjustment unit corresponding to the abnormal region among the adjustment units and causes the display unit to display information prompting adjustment by the adjustment unit.

11. The transport device according to claim 9, wherein
the transporting belt includes an adhesive layer to which the medium is attachable, the transporting belt being configured to transport the medium attached to the adhesive layer in the transport direction, and
the blade is configured to come into contact with a front surface of the adhesive layer to remove the adhering substance adhering to the front surface.

12. The transport device according to claim 9, wherein
the detectors detect the force received by the blade from the transporting belt as a load and
the control unit
identifies a region where the load is excessive or deficient as the abnormal region based on the detection results of the detectors,
identifies
an amount of excess or deficiency or
an amount by which the excess or deficiency is to be reduced for the region, and
displays information indicating the identified region and amount on the display unit.

13. The transport device according to claim 9, wherein
the at least one adjustment unit is a plurality of the adjustment units,
the adjustment units are provided at positions different from each other in the width direction and the control unit causes the display unit to display an adjustment amount by the adjustment unit corresponding to the abnormal region.

14. The transport device according to claim 9, wherein the detectors include a first detector configured to detect a load received by the blade from the transporting belt.

15. The transport device according to claim 9, wherein the detectors include a second detector configured to detect vibration of the blade generated when the transporting belt moves in the transport direction.

* * * * *